(12) United States Patent
Yang et al.

(10) Patent No.: US 11,956,777 B2
(45) Date of Patent: Apr. 9, 2024

(54) MANAGEMENT OF OVERLAPPING SEMI-PERSISTENT SCHEDULING (SPS) CONFIGURED PHYSICAL DOWNLINK SHARED CHANNEL (PDSCH) TRANSMISSION OCCASIONS

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/444,024

(22) Filed: Jul. 29, 2021

(65) Prior Publication Data
US 2022/0046678 A1    Feb. 10, 2022

Related U.S. Application Data

(60) Provisional application No. 63/062,793, filed on Aug. 7, 2020.

(51) Int. Cl.
*H04W 72/12* (2023.01)
*H04L 1/1812* (2023.01)
*H04L 1/1867* (2023.01)
*H04W 72/04* (2023.01)
*H04W 72/0446* (2023.01)
*H04W 72/1273* (2023.01)
(Continued)

(52) U.S. Cl.
CPC ....... *H04W 72/1273* (2013.01); *H04L 1/1819* (2013.01); *H04L 1/1896* (2013.01); *H04W 72/0446* (2013.01); *H04W 76/30* (2018.02)

(58) Field of Classification Search
None
See application file for complete search history.

(56) References Cited

U.S. PATENT DOCUMENTS 11,425,737 B2 * 8/2022 Hosseini .................. H04L 5/005
2019/0253196 A1 * 8/2019 Medles .................. H04L 1/1664
(Continued)

OTHER PUBLICATIONS

International Search Report and Written Opinion—PCT/US2021/044073—ISA/EPO—dated Apr. 7, 2022.
(Continued)

*Primary Examiner* — Sai Aung
(74) *Attorney, Agent, or Firm* — Haynes and Boone, LLP

(57) ABSTRACT

Some aspects of the present disclosure disclose methods and systems related to managing overlapping semi-persistent scheduling (SPS) configured physical downlink shared channel (PDSCH) transmission occasions. In some aspects, a user equipment (UE) may identify one or more semi-persistent scheduling (SPS) physical downlink shared channel (PDSCH) transmission occasions in a slot and receive, from a base station (BS) and via a physical downlink control channel (PDCCH), a semi-persistent scheduling (SPS) release configured to release at the UE a SPS configuration including a configuration index. The UE may then perform SPS PDSCH transmission occasions collision avoidance procedures while releasing the SPS PDSCH transmission occasion to manage overlapping SPS PDSCH transmission occasions.

30 Claims, 11 Drawing Sheets

(51) Int. Cl.
*H04W 74/08* (2009.01)
*H04W 76/30* (2018.01)

(56) References Cited

U.S. PATENT DOCUMENTS

| | | | | |
|---|---|---|---|---|
| 2019/0320396 | A1* | 10/2019 | Bagheri | H04W 52/34 |
| 2020/0267597 | A1* | 8/2020 | Huang | H04W 76/14 |
| 2021/0050948 | A1* | 2/2021 | Gao | H04W 72/23 |
| 2021/0314094 | A1* | 10/2021 | Gao | H04L 1/1896 |
| 2021/0344448 | A1* | 11/2021 | Nogami | H04L 5/0055 |
| 2022/0053530 | A1* | 2/2022 | Ahmed | H04W 76/28 |
| 2023/0319843 | A1* | 10/2023 | Lei | H04L 5/0091 370/329 |

OTHER PUBLICATIONS

Nokia., et al., "Multiple UL SPS Configuration Collision Handling", 3GPP Draft, R2-1708592_ Multiple UL SPS Configuration Collision Handling, 3GPP TSG RAN WG1 Ad-Hoc Meeting 1901, R1-1900706, Discussion on HARQ Enhancements in NR-U, 3rd Generation Partnership Project (3GPP), Mobile Competence Centre, 650, Route Des Lucioles, F-06921 Sophia-Antipolis Cedex, France, RAN WG2, No. Berlin, Germany, Aug. 21, 2017-Aug. 25, 2017, Aug. 20, 2017 (Aug. 20, 2017), 3 Pages, XP051318439, Retrieved from the Internet: URL: http://www.3gpp.org/ftp/Meetings_3GPP_SYNC/RAN2/Docs/ [retrieved on Aug. 20, 2017], Section 3, p. 1, figure 1.

Qualcomm: "Remaining Issues on DL SPS for URLLC", 3GPP Draft, R1-2002549, 3GPP TSG RAN WG1 #100b, e-Meeting, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), XP051875663, 4 Pages, Retrieved from the Internet: URL: https://ftp.3gpp.org/tsg_ran/WG1_RL1/TSGR1_100b_e/Docs/R1-2002549.zip R1-2002549 Remaining Issues on DL SPS for URLLC.docx [retrieved on Apr. 11, 2020] pp. 3, 4, Section 3.

CATT: "Remaining Issues on IIoT", 3GPP Draft, 3GPP TSG RAN WG1 Meeting #100bis, R1-2002088, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875445, 9 Pages, Retrieved from the Internet: URL: https://ftp.3gpp.org/tsg_ran/WG1_RL1/TSGR1_100b_e/Docs/R1-2002088.zip. R1-2002088.docx [Retrieved on Apr. 11, 2020], Section 2.2, p. 4-p. 5, figure 2.

Mediatek Inc: "Remaining Issues on Multiple SPS Configurations", 3GPP TSG RAN WG1 Meeting #100bis-e, R1-2001842, e-Meeting, Apr. 20, 2020-Apr. 30, 2020, 3 Pages, Apr. 30, 2020 (Apr. 30, 2020), XP051875309, Retrieved from the Internet: URL: https://ftp.3gpp.org/tsg_ran/WG1_RL1/TSGR1_100b_e/Docs/R1-2001842.zip. R1-2001842 Remaining-Issues on Multiple SPS Configurations.docx [Retrieved on Apr. 11, 2020] Section 3, p. 3, the whole document.

Partial International Search Report—PCT/US2021/044073—ISA/EPO—dated Nov. 23, 2021.

Spreadtrum Communications: "Remaining Issues on Enhanced DL SPS for IIoT", 3GPP Draft, 3GPP TSG RAN WG1 #101, R1-2003982, 3rd Generation Partnership Project (3GPP), Cedex, France, vol. RAN WG1, No. e-Meeting, May 25, 2020-Jun. 5, 2020, May 16, 2020 (May 16, 2020), XP051885744, 8 Pages, Retrieved from the Internet: URL: https://ftp.3gpp.org/tsg_ran/WG1_RL1/TSGR1_101-e/Docs/R1-2003982.zip. R1-2003982.docx [Retrieved on May 16, 2020] Section 2.1, Section 2.2, Section 2.3, p. 1-p. 4, figure 1.

\* cited by examiner

MANAGEMENT OF OVERLAPPING SEMI-PERSISTENT SCHEDULING (SPS) CONFIGURED PHYSICAL DOWNLINK SHARED CHANNEL (PDSCH) TRANSMISSION OCCASIONS

CROSS-REFERENCE TO RELATED APPLICATIONS

The present application claims priority to and the benefit of the U.S. Provisional Patent Application No. 63/062,793, filed Aug. 7, 2020, titled "Management of Overlapping Semi-Persistent Scheduling (SPS) Configured Physical Downlink Shared Channel (PDSCH) Transmission Occasions," which is hereby incorporated by reference in its entirety as if fully set forth below and for all applicable purposes.

FIELD OF TECHNOLOGY

The following relates generally to wireless communications and more specifically to the management of overlapping semi-persistent scheduling (SPS) configured physical downlink shared channel (PDSCH) transmission occasions.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In wireless communication systems that operate in accordance to Releases 15 and 16 of the "3rd Generation Partnership Project" (3GPP), transmissions over one or more channels are scheduled to permit multiple devices to communicate using the one or more channels. Scheduling is the process of allocating resources for transmitting data. New radio (NR) scheduling is dictated by network (e.g., gNodeB or gNB) and the user equipment (UE) just follows the schedule the network indicates. The overall scheduling mechanism in NR is similar to long-term evolution (LTE) scheduling, but NR has finer granularity than LTE especially in terms of time domain scheduling at the physical layer. There are two types of scheduling for downlink communications (e.g., from a gNodeB to a UE). One is called "Dynamic Scheduling" and the other one SPS (Semi Persistent Scheduling). Dynamic scheduling is the mechanism in which each and every physical downlink shared channel (PDSCH) is scheduled by a Downlink Control Indicator or Downlink Control Information (DCI). SPS is the mechanism in which the PDSCH transmission is scheduled by an RRC message (or DCI). The PDSCH is divided into slots, in which data is transmitted. User data traffic is transmitted, between a gNodeB and a UE, in a PDSCH, and the UE transmits a requisite acknowledgment/negative-acknowledgment (ACK/NACK) report at a specified time on the uplink channels.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method of wireless communication performed by a user equipment (UE). The method comprises identifying a plurality of semi-persistent scheduling (SPS) physical downlink shared channel (PDSCH) transmission occasions in a slot; and receiving, from a base station (BS) and via a physical downlink control channel (PDCCH), a semi-persistent scheduling (SPS) release configured to release at the UE a SPS configuration including a configuration index. In some aspects, the SPS configuration can be configured to schedule, of the plurality of SPS PDSCH transmission occasions in the slot, a SPS PDSCH transmission occasion associated with the configuration index. The method further comprises, in response to the receiving the SPS release, performing a first action or a second action. The first action includes releasing the SPS PDSCH transmission occasion associated with the configuration index followed by applying a first SPS PDSCH transmission occasions collision avoidance procedure to a first set of SPS PDSCH transmission occasions, wherein the first set of SPS PDSCH transmission occasions including SPS PDSCH transmission occasions of the plurality of SPS PDSCH transmission occasions (e.g., remaining after the releasing the SPS PDSCH transmission occasion associated with the configuration index). The second action that is applying a second SPS PDSCH transmissions occasions collision avoidance procedure to a second set of SPS PDSCH transmission occasions followed by releasing the SPS PDSCH transmission occasion associated with the configuration index, wherein the second set of SPS PDSCH transmission occasions includes the plurality of SPS PDSCH transmission occasions.

In some aspects, a method of wireless communication performed by a user equipment (UE) comprises identifying one or more semi-persistent scheduling (SPS) physical downlink shared channel (PDSCH) transmission occasions in a slot; and receiving, from a base station (BS) and via a physical downlink control channel (PDCCH), a semi-persistent scheduling (SPS) activation downlink control information (DCI) configured to activate at the UE a SPS configuration. In some aspects, the SPS configuration can include a configuration index and configured to schedule a SPS PDSCH transmission occasion associated with the configuration index. Some aspects of the method further include activating or reactivating, in response to the receiving the SPS activation, the SPS PDSCH transmission occasion associated with the configuration index based on a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure. In such aspects, the first SPS PDSCH transmission occasions collision avoidance procedure can be applied to a first set of SPS PDSCH transmission occasions including the one or more SPS PDSCH transmission occasions and the second SPS PDSCH transmission occasions collision avoidance procedure can be applied to a second set of SPS PDSCH transmission occasions including the SPS PDSCH transmission occasion associated with the configuration index and the one or more SPS PDSCH transmission occasions.

Some aspects of the present disclosure disclose a user equipment (UE) comprising a transceiver and a processor. In some aspects, the processor is configured to identify a plurality of semi-persistent scheduling (SPS) physical downlink shared channel (PDSCH) transmission occasions in a slot. Further, the transceiver can be configured to receive, from a base station (BS) and via a physical downlink control channel (PDCCH), a semi-persistent scheduling (SPS) release configured to release at the UE a SPS configuration including a configuration index. In some aspects, the SPS configuration can be configured to schedule, of the plurality of SPS PDSCH transmission occasions in the slot, a SPS PDSCH transmission occasion associated with the configuration index. In some aspects, the processor can be further configured to, in response to the receiving the SPS release, perform the aforementioned first action or second action.

Some aspects of the present disclosure disclose a user equipment (UE) comprising a transceiver and a processor. In some aspects, the processor is configured to identify one or more semi-persistent scheduling (SPS) physical downlink shared channel (PDSCH) transmission occasions in a slot. Further, the transceiver can be configured to receive, from a base station (BS) and via a physical downlink control channel (PDCCH), a semi-persistent scheduling (SPS) activation downlink control information (DCI) configured to activate at the UE a SPS configuration, the SPS configuration including a configuration index and configured to schedule a SPS PDSCH transmission occasion associated with the configuration index, the processor further configured to, in response to the receiving the SPS activation. In some aspects, the processor can be configured to activate or reactivate the SPS PDSCH transmission occasion associated with the configuration index based on: a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure, wherein the first SPS PDSCH transmission occasions collision avoidance procedure is applied to a first set of SPS PDSCH transmission occasions including the one or more SPS PDSCH transmission occasions; and the second SPS PDSCH transmission occasions collision avoidance procedure is applied to a second set of SPS PDSCH transmission occasions including the SPS PDSCH transmission occasion associated with the configuration index and the one or more SPS PDSCH transmission occasions.

Some aspects of the present disclosure disclose a non-transitory computer-readable medium (CRM) having program code recorded thereon. In some aspects, the program code comprises code for causing a user equipment (UE) to identify a plurality of semi-persistent scheduling (SPS) physical downlink shared channel (PDSCH) transmission occasions in a slot; and code for causing the UE to receive, from a base station (BS) and via a physical downlink control channel (PDCCH), a semi-persistent scheduling (SPS) release configured to release at the UE a SPS configuration including a configuration index, wherein the SPS configuration configured to schedule, of the plurality of SPS PDSCH transmission occasions in the slot, a SPS PDSCH transmission occasion associated with the configuration index. In some aspects, the program code comprises code for causing the UE, in response to the receiving the SPS release, perform the aforementioned first action or second action.

Some aspects of the present disclosure disclose a non-transitory computer-readable medium (CRM) having program code recorded thereon. In some aspects, the program code comprising code for causing a user equipment (UE) to identify one or more semi-persistent scheduling (SPS) physical downlink shared channel (PDSCH) transmission occasions in a slot; and code for causing the UE to receive, from a base station (BS) and via a physical downlink control channel (PDCCH), a semi-persistent scheduling (SPS) activation downlink control information (DCI) configured to activate at the UE a SPS configuration. In some aspects, the SPS configuration includes a configuration index and configured to schedule a SPS PDSCH transmission occasion associated with the configuration index. The program code further comprises code for causing the UE, in response to the receiving the SPS activation activate or reactivate the SPS PDSCH transmission occasion associated with the configuration index based on a separation in symbols between an end of the SPS activation DCI and a start of an earliest SPS PDSCH transmission occasion of the one or more of SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure, wherein the first SPS PDSCH transmission occasions collision avoidance procedure applied to a first set of SPS PDSCH transmission occasions including one or more SPS PDSCH transmission occasions; and the second SPS PDSCH transmission occasions collision avoidance procedure applied to a second set of SPS PDSCH transmission occasions including the SPS PDSCH transmission occasion associated with the configuration index and the one or more SPS PDSCH transmission occasions.

Some aspects of the present disclosure disclose a user equipment (UE), comprising: means for identifying a plurality of semi-persistent scheduling (SPS) physical downlink shared channel (PDSCH) transmission occasions in a slot; and means for receiving, from a base station (BS) and via a physical downlink control channel (PDCCH), a semi-persistent scheduling (SPS) release configured to release at the UE a SPS configuration including a configuration index, wherein the SPS configuration configured to schedule, of the plurality of SPS PDSCH transmission occasions in the slot, a SPS PDSCH transmission occasion associated with the configuration index. The UE further comprises means for, in response to the receiving the SPS release, performing the aforementioned first action or second action.

Some aspects of the present disclosure disclose a user equipment (UE), comprising: means for identifying one or more semi-persistent scheduling (SPS) physical downlink shared channel (PDSCH) transmission occasions in a slot; and means for receiving, from a base station (BS) and via a physical downlink control channel (PDCCH), a semi-persistent scheduling (SPS) activation downlink control information (DCI) configured to activate at the UE a SPS configuration, wherein the SPS configuration including a configuration index and configured to schedule a SPS PDSCH transmission occasion associated with the configuration index. The UE further comprises means for, in response to the receiving the SPS activation activating or reactivating the SPS PDSCH transmission occasion associated with the configuration index based on: a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure, wherein the first SPS PDSCH transmission occasions collision avoidance procedure is applied to a first set of SPS PDSCH transmission occasions including the one or more SPS PDSCH transmission occasions; and the second SPS PDSCH transmission occasions collision avoidance procedure is applied to a second set of SPS PDSCH transmission occasions including the SPS PDSCH transmission occasion associated with the configuration index and the one or more SPS PDSCH transmission occasions.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
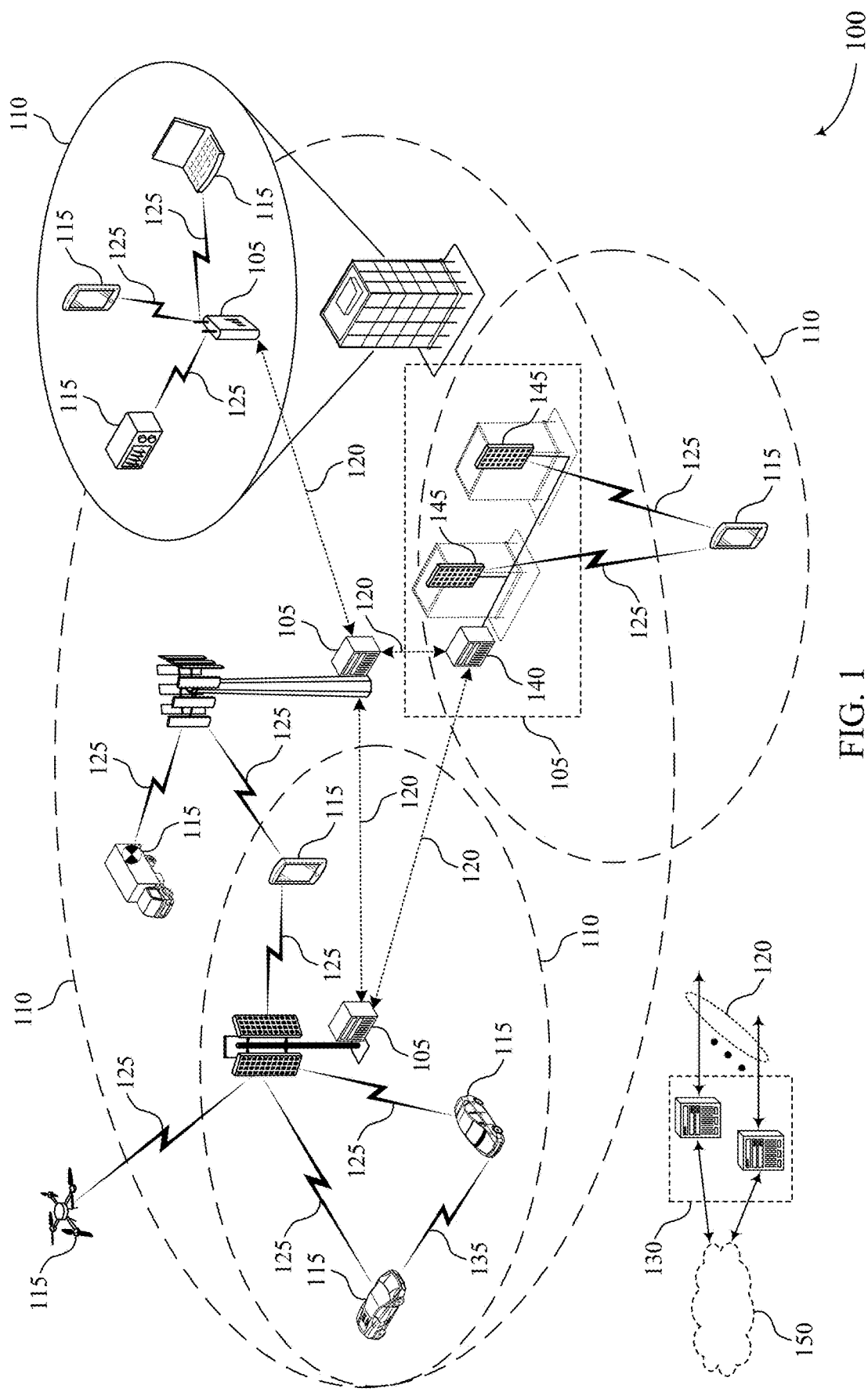
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., 99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgment in the same subframe. The self-contained integrated subframe supports communications in unlicensed or contention-based shared spectrum, adaptive UL/downlink that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In wireless communication networks operating according to Releases 15 and 16 of the 3GPP, multiple active semi-persistent scheduling (SPS) configurations for a given bandwidth part (BWP) of a serving cell may be supported to enhance reliability and reduce latency for data traffic or service types such as enhanced mobile broadband (eMBB), ultra-reliable low-latency communications (URLLC), etc. The maximum number of uplink (UL) configured grant (CG) configurations per BWP of a serving cell is 12 and a user equipment (UE) may have multiple SPS configurations (and a single SPS configuration may be shared between several UEs). A base station (e.g., gNB) may activate or release the SPS configurations via a downlink control information (DCI). In some cases, the base station may separately activate SPS configurations, for example via an activate DCI (e.g., DCI format 0_0, 0_1 and 0_2), but not jointly. That is, joint activation of multiple SPS configurations may not be supported. The DCI activating a SPS configuration may include a hybrid automatic repeat request (HARQ) process number (HPN) field indicating the configuration index of the SPS configuration that is being activated by the DCI. In some cases, there can be maximum four least significant bits of HPN field to indicate the SPS configuration that is being activated. In release 16 of 3GPP, the minimum SPS periodicity is reduced to 1 slot.

In some cases, joint as well as separate releases of multiple SPS configurations for a given BWP of a serving cell may be supported. For example, a base station may transmit a release DCI (e.g., DCI format 0_0, 0_1 and 0_2) including configuration indices to identify the SPS configurations that are to be released by the DCI. In some cases, there can be maximum four least significant bits of HPN field to indicate the SPS configurations that are being released (e.g., separately or jointly) by the release DCI. In the case of separate releases of SPS configurations, the HPN in the release DCI may indicate the SPS configuration index that may be released by the release DCI. In the case of joint release of multiple SPS configurations by a single DCI, and where a table of states is higher layer configured, a state can be used to indicate a single SPS configuration or multiple SPS configurations to be released, where each state can be mapped to the single SPS configuration or multiple SPS configuration. In the case of no higher layer configured state(s), separate release can be used where the release may correspond to the SPS configuration index indicated by the release DCI. The codepoint by the HPN may map to the row index of the configured table of states. For instance, row 0 of an RRC table for joint release of SPS configurations may map to configuration indices 1 and 3, row 1 to configuration indices 0 and 2, and row 2 to configuration index 4.

In general, a UE may transmit to the base station a HARQ acknowledgment (ACK) or negative-acknowledgment (NACK) to inform the base station about the successful or unsuccessful arrival of data transmitted to the UE (e.g., via physical downlink shared channel (PDSCH)). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

For both type-1 and type-2 HARQ-ACK codebook construction, one HARQ-ACK bit may be generated for release of SPS configured transmission occasion (e.g., SPS PDSCH release) with a joint release DCI. HARQ-ACK codebook may refer to the mechanism to transmit multiple ACK/NACK bits in a same transmission, such as determining the number and ordering of the ACK/NACK bits. The HARQ-ACK bit location for SPS PDSCH release with a separate release DCI can be derived based on the TDRA table row index indicated in the activation DCI and the PDSCH-to-HARQ timing indicator K1 indicated in the release DCI.

In some cases, multiple SPS configured PDSCHs (alternatively referred herein as "SPS configured PDSCH transmission occasions") configured by different SPS configurations may overlap in a slot, and the UE may follow a SPS PDSCH transmission occasions collision avoidance procedure (alternatively referred hereinafter as "SPS PDSCH collision avoidance procedure") to resolve the collisions, i.e., overlaps, that may occur between the overlapping SPS PDSCH transmission occasions so that the UE may determine non-overlapping SPS PDSCH transmission occasions for receiving data or transmissions from the base station to which the UE is connected. In some instances, the number of the non-overlapping SPS PDSCH transmission occasions may depend on the capability of the UE. To determine, from multiple overlapping SPS PDSCH transmission occasions (e.g., SPS configured PDSCH transmission occasions that may be without corresponding PDCCH transmissions), non-overlapping SPS PDSCH transmission occasions for receiving transmissions, the UE may, after resolving overlapping with symbols in the slot indicated as uplink by tdd-UL-DL-ConfigurationCommon or by tdd-UL-DL-Configuration-Dedicated, the following steps. At step 0, the UE may set j=0, where j is the number of selected PDSCH(s) for decoding. Q is the set of activated PDSCHs without corresponding PDCCH transmissions within the slot. At step 1, the UE may receive one PDSCH with the lowest configured SPS configuration index within Q, and set j=j+1. Further, the UE may designate the received PDSCH as survivor PDSCH. At step 2, the survivor PDSCH in step 1 and any other PDSCH(s) overlapping (even partially) with the survivor PDSCH in step 1 may be excluded from Q. At step 3, the UE may repeat steps 1 and 2 until Q is empty or j is equal to the number of unicast PDSCHs in a slot supported by the UE. SPS PDSCH collision avoidance procedure is further discussed in the 3GPP document TS 38.214, titled "Technical Specification 5G; NR; Physical layer procedures for data (3GPP TS 38.214 version 16.2.0 Release 16)", July 2020, which is incorporated herein by reference in its entirety.

In releasing a SPS configuration of a transmission occasion scheduled for transmission via a PDSCH (i.e., in releasing a "SPS PDSCH" or "SPS configured PDSCH transmission occasion"), an SPS release (alternatively referred herein as "SPS release PDCCH") may be transmitted to the UE via PDCCH and may occur in the same slot (e.g., of the radio frame structure of the 5G network) as that of the SPS PDSCH. In some aspects, it is to be understood that what is scheduled is a SPS configured PDSCH transmission occasion and not an actual transmission. Whether a transmission is occurs or not can depend on whether the SPS configured PDSCH transmission occasion overlaps with other SPS configured PDSCH transmission occasions and how the UE resolves the overlaps or collisions or conflicts, as discussed in the present disclosure. The SPS release may be received at the UE in a slot before the end or termination of the reception, in the same slot, of a SPS PDSCH with the SPS configuration that is to be released by the SPS release. In other words, the UE may support receiving a SPS release PDCCH before the end of the SPS PDSCH reception for the same SPS configuration corresponding to the SPS release PDCCH. A one-bit HARQ-ACK may be generated for the SPS release and the UE may not expect to receive the SPS PDSCH (e.g., no data or SPS PDSCH is received at the UE) if HARQ-ACKs for the SPS release and the SPS PDSCH reception would map to the same physical uplink control channel (PUCCH). Further, the SPS release may not be received in a slot after the end or termination of the reception, in the same slot, of a SPS PDSCH with the SPS configuration that is to be released by the SPS release if HARQ-ACKs for the SPS release and the SPS PDSCH reception would map to the same PUCCH.

In release 15 of 3GPP, the UE may generate a type 1 HARQ-ACK codebook based on the corresponding time-domain occasions of the PDSCH. Further, the UE may report 1 bit HARQ-ACK for the SPS PDCCH. In such cases, there may not be any PDSCH occasion for the PDCCH SPS release. To report HARQ-ACK for the SPS release PDCCH, the UE may put the HARQ-ACK in a location in the HARQ-ACK codebook that corresponds to the corresponding PDSCH occasion. That is, a location in the Type-1 HARQ-ACK codebook for HARQ-ACK information corresponding to a single SPS PDSCH release can be same as for a corresponding SPS PDSCH reception. Further, a location in the Type-1 HARQ-ACK codebook for HARQ-ACK information corresponding to multiple SPS PDSCH releases by a single DCI format can be same as for a corresponding SPS PDSCH reception with the lowest SPS configuration index among the multiple SPS PDSCH releases. Additional details related to SPS and HARQ-ACK feedback for SPS are discussed in the 3GPP document TS 38.213, titled "Technical Specification 5G; NR; Physical layer procedures for control (3GPP TS 38.213 version 16.2.0 Release 16)", July 2020, which is incorporated herein by reference in its entirety.

As discussed above, a UE may receive multiple SPS configured PDSCH transmission occasions configured by different SPS configurations (i.e., multiple SPS configured PDSCH transmission occasions associated with different SPS configuration indices) that may overlap in a slot, and the UE may follow a SPS PDSCH collision avoidance procedure to resolve the collisions that may occur between the overlapping SPS PDSCH transmission occasions so that the UE may determine non-overlapping SPS PDSCH transmission occasions for receiving data or transmissions from the base station to which the UE is connected. Further, the UE may also receive a SPS release PDCCH including or associated with a configuration index that is configured to release the SPS configured PDSCH transmission occasion, of the multiple SPS configured PDSCH transmission occasions, that has the same configuration index. In such cases, there may be ambiguity as to what takes place first, as applying the SPS PDSCH collision avoidance procedure first followed by releasing the SPS configured PDSCH transmission occasion with that configuration index may leave different non-overlapping SPS PDSCH transmission occasions compared to releasing the SPS configured PDSCH transmission occasion with that configuration index first followed by applying the SPS PDSCH collision avoidance procedure. Aspects of the present disclosure provide solutions to these and related scenarios associated with managing overlapping semi-persistent scheduling (SPS) configured physical downlink shared channel (PDSCH) transmission occasions.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example wireless communication network 100 according to some aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Additionally, it is noted here that the subcarrier spacing (SCS) has an effect on the number of symbols, such as OFDM symbols, within a subframe. In particular, as SCS spacing gets wider or greater, the slot length will become shorter. For example, a scheduling cell (e.g., base station or gNB) can have an SCS of 15 kHz (i.e., spacing parameter $\mu=0$ in known spacing numerology where the SCS or frequency spacing $\Delta f$ is determined by the equation $\Delta f = 2^\mu \times 15$ kHz), which is typically the shortest used SCS spacing, and the scheduled cells (e.g., UEs) can utilize an SCS of 120 kHz (i.e., spacing parameter $\mu=3$ in known spacing numerology) for purposes of this example, but those skilled in the art will appreciate the present disclosure is applicable to any of a number of SCS spacings. In known systems, the 15 kHz SCS would result in a one (1) millisecond (ms) slot, which could also constitute an entire 1 ms subframe. The 120 kHz SCS would result in 8 slots having a duration of ⅛ or 0.125 ms in the 1 ms subframe. These slots can represent eight PDSCH transmissions in a scheduled cell that are scheduled by the PDCCH in the scheduling cell. Of further note, in this example the single slot of the scheduling cell overlaps in time with the eight slots of the scheduled cell when 15 kHz SCS and 120 kHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., $\mu=2$) in the scheduled cell.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2 P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2 P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may select values for scheduling or slot offset parameters in a radio frame structure representing resources (e.g., time-frequency resources) for signal communications between the UE 115 and the base stations 105, the requested values for the set of parameters based at least in part on system state information of the UE 115 and attributes related to an operational or activity mode of an application executing or operating on the UE 115. The UE 115 may transmit, to a base station 105, the selected values for the set of parameters. The UE 115 may receive, at least in part as response to the selected values for the set of parameters transmitted to the base station 105, the configured values for the set of slot offset parameters for the UE 115. The UE 115 may then communicate with the base station 105 according to the configured parameters.

Figure 2:
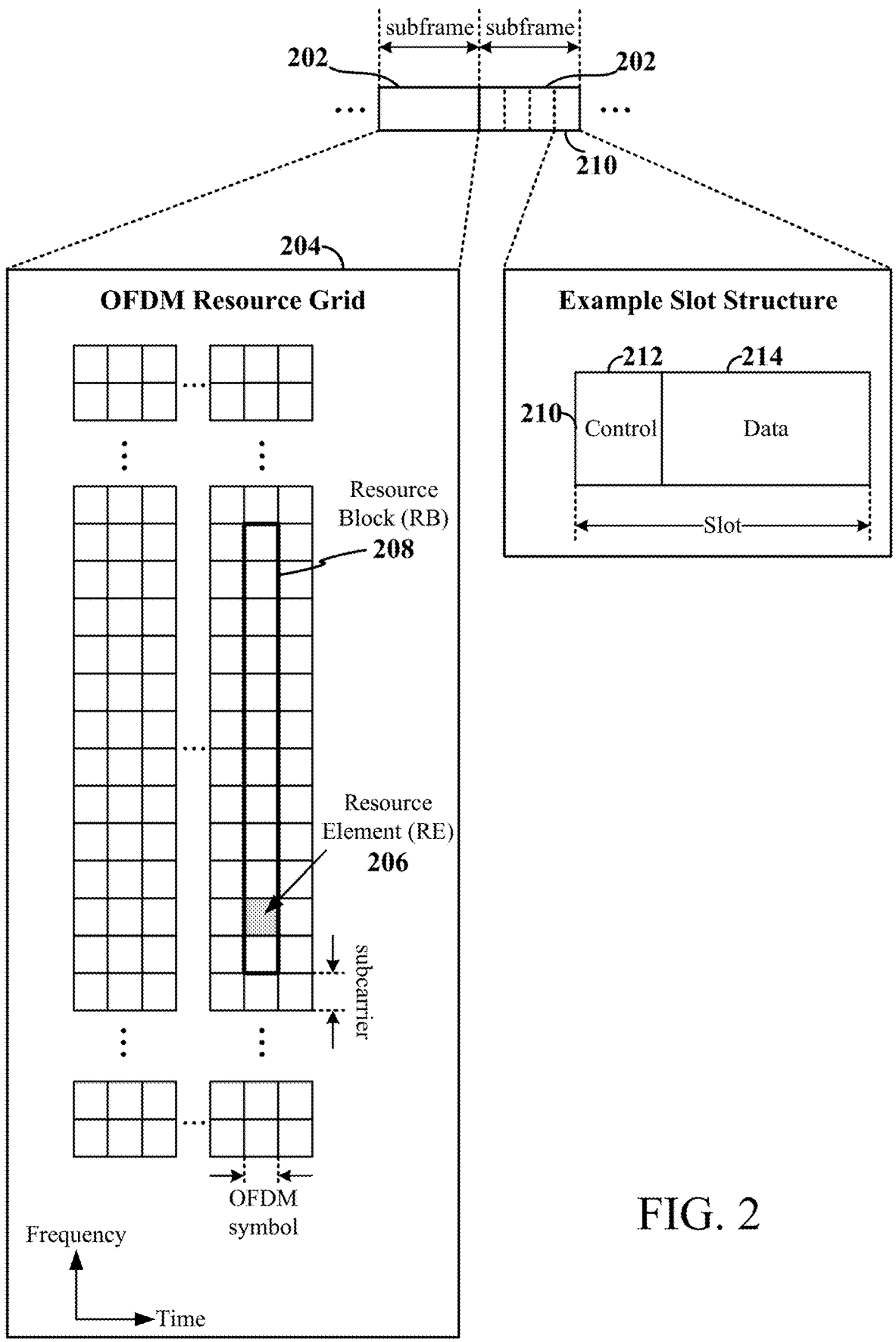
FIG. 2 illustrates an example schematic of an organization of wireless resources in an air interface utilizing orthogonal frequency divisional multiplexing (OFDM), according to some aspects of the present disclosure.

FIG. 2 illustrates an example schematic of an organization of wireless resources in an air interface utilizing orthogonal frequency divisional multiplexing (OFDM), according to some aspects of the present disclosure. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms. In FIG. 2, an expanded view of an exemplary subframe 202 is illustrated, showing an OFDM resource grid. However, as those skilled in the art can readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The radio frame structure or resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, in some aspects, it can be assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

According to some examples, a frame may refer to a duration of 10 ms, with each frame sub-divided into 10 subframes 202 of 1 ms each. Each 1 ms subframe may consist of one or multiple adjacent slots. In the example shown in FIG. 2, subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 210 illustrates the slot as including a control region 212 and a data region 314.

In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 214 of the slot 210 may include a physical sidelink shared channel (PSSCH) including the data transmitted by the initiating (transmitting) sidelink device within resources reserved over the sidelink carrier by the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above are not necessarily all the channels or carriers that may be utilized between a scheduling entity 108 and scheduled entities (e.g., one of more UE 106), and those of ordinary skill in the art may recognize that other channels or carriers may be utilized in addition to those illustrated, such as other traffic, control, and feedback channels.

Figure 3:
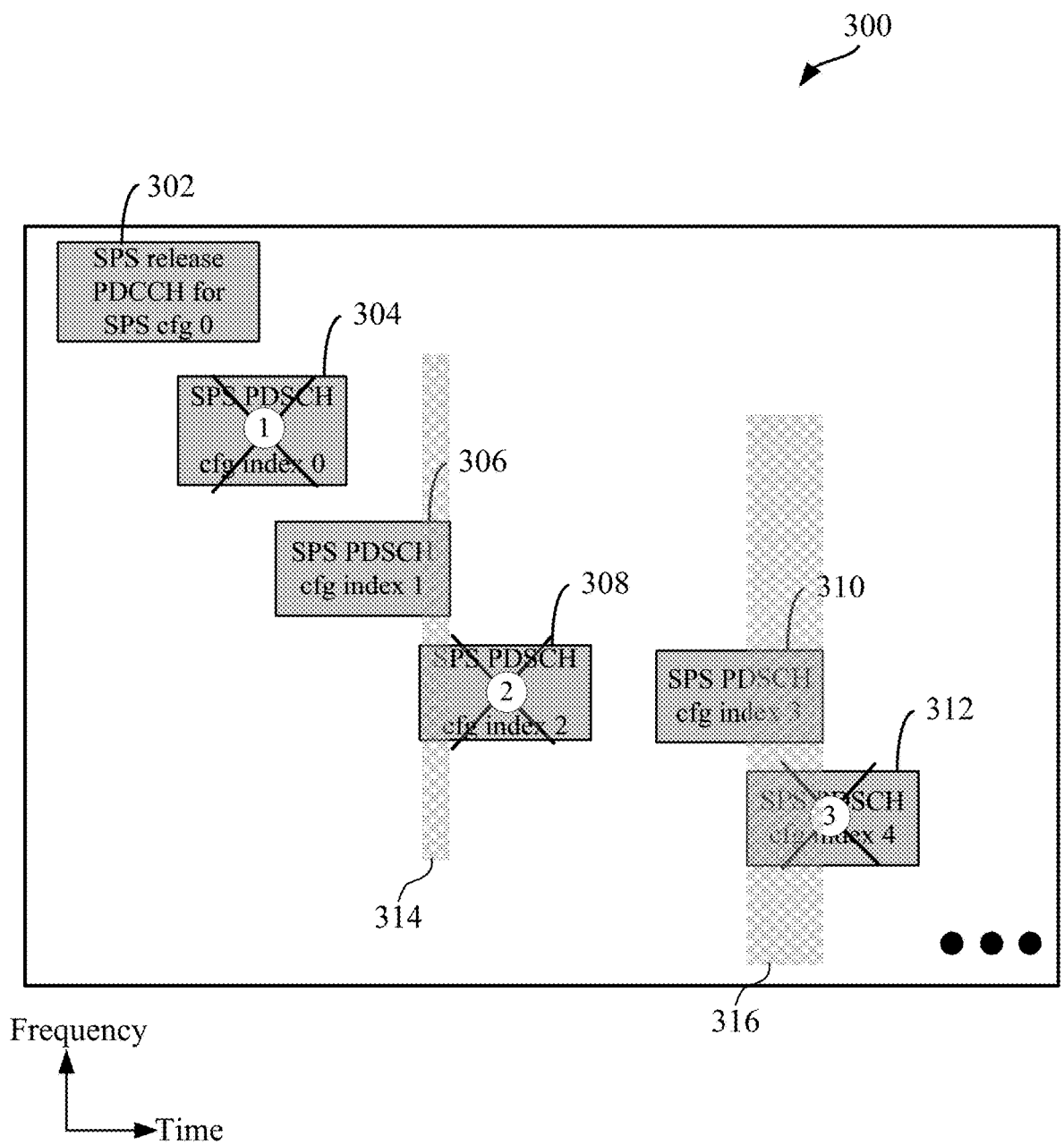
FIG. 3 shows an example illustration of managing overlapping semi-persistent scheduling (SPS) configured physical downlink shared channel (PDSCH) transmission occasions, according to some aspects of the present disclosure.

FIG. 3 shows an example illustration of the management of overlapping semi-persistent scheduling (SPS) configured physical downlink shared channel (PDSCH) transmission occasions, according to some aspects of the present disclosure. In some aspects, a UE receives from a base station (BS) and via a physical downlink control channel (PDCCH), a SPS release PDCCH that is configured to release at the UE a SPS configuration. In some cases, the SPS configuration may include or be associated with a configuration index and may be configured to schedule in a slot a SPS PDSCH transmission occasion that is associated with the same configuration index. In some instances, the slot may also have multiple SPS configured PDSCH transmission occasions, also referred to as SPS PDSCH transmission occasions without corresponding PDCCH transmissions, some of which may be overlapping with each other and/or with the SPS PDSCH transmission occasion that is associated with the configuration index of the SPS release. The multiple SPS configured PDSCH transmission occasions may be configured by different SPS configurations, i.e., by SPS configurations having different configuration indices. For instance, FIG. 3 shows an example illustration of an SPS release 302 received by an UE in a slot and including or being associated with a configuration index (e.g., index=0). The SPS release may be configured to release the SPS configuration that configures the SPS PDSCH transmission occasion 304 associated with the same configuration index=0. In some aspects, the same slot may also include multiple transmission occasions 306, 308, 310 and 312, each configured by SPS configurations including or associated with different configuration indices.

In some aspects, the SPS release may be configured to jointly release multiple SPS configurations. Although the discussions in the present disclosure are presented in terms of separate releases of SPS configurations, i.e., SPS configurations being released via separate SPS release PDCCHs, the various aspects equally apply when the SPS release PDCCH jointly releases multiple SPS configurations. That is, all the techniques for managing SPS configured ODSCH transmission occasions discussed throughout the present disclosure may apply to the case in which the SPS release PDCCH jointly releases two or more SPS PDSCHs of a plurality of PDSCHs in a slot.

In some aspects, the UE may resolve the collisions or conflicts that arise due to the SPS configured PDSCH transmission occasions overlapping with each other by first releasing the SPS PDSCH transmission occasion that is associated with the same configuration index as that of the SPS release, and then applying a SPS PDSCH collision avoidance procedure to the rest of the SPS PDSCH transmission occasions (i.e., the SPS PDSCH transmission occasions without corresponding PDCCH transmissions) as discussed above. In other words, if more than one PDSCH on a serving cell each without a corresponding PDCCH transmission are in a slot, after resolving overlapping with symbols in the slot indicated as uplink by tdd-UL-DL-ConfigurationCommon, or by tdd-UL-DL-Configuration-Dedicated, and after removing PDSCH(s) due to received SPS release PDCCH(s) in the slot, a UE receives one or more PDSCHs without corresponding PDCCH transmissions in the slot by applying the aforementioned SPS PDSCH collision avoidance procedure, as illustrated with reference to FIG. 3 below.

In FIG. 3, upon receiving the SPS release 302 with configuration index 0, the UE first releases the SPS configured PDSCH transmission occasion 304 that is associated with the configuration index 0, as indicated with the "X" and ① to indicate that SPS configured PDSCH transmission occasion 304 is the first to be released. Then, the UE can apply the SPS PDSCH collision avoidance procedure to the SPS configured PDSCH transmission occasions 306, 308, 310 and 312 remaining in the slot after the release of the SPS configured PDSCH transmission occasion 304. The first step of the procedure is to release or remove the SPS configured PDSCH transmission occasion 308 that overlaps 314 with the SPS configured PDSCH transmission occasion 306 that has the lowest configuration index of all the SPS configured PDSCH transmission occasions 306, 308, 310 and 312 remaining in the slot after the release of the SPS configured PDSCH transmission occasion 304, as indicated with the "X" and ② to indicate that SPS configured PDSCH transmission occasion 304 is the second to be released or removed. FIG. 3 shows only one SPS configured PDSCH transmission occasion 308 overlapping 314 with the SPS configured PDSCH transmission occasion 306 that has the lowest configuration index of all the SPS configured PDSCH transmission occasions 306, 308, 310 and 312 remaining in the slot after the release of the SPS configured PDSCH transmission occasion 304. However, it is to be understood that FIG. 3 is an example illustration and there can be multiple SPS configured PDSCH transmission occasions overlapping with SPS configured PDSCH transmission occasion 306, in which case all the overlapping SPS configured PDSCH transmission occasions may also be released or removed. According to the procedure, the UE can then receive transmission via the SPS configured PDSCH transmission occasion 306 (but not via the released or removed SPS configured PDSCH transmission occasion 308).

After this step, there may still be additional overlapping SPS configured PDSCH transmission occasions left in the set of SPS configured PDSCH transmission occasions 306, 308, 310 and 312 remaining in the slot after the release of the SPS configured PDSCH transmission occasion 304, such as SPS configured PDSCH transmission occasions 310 and 312 as shown in FIG. 3. In such cases, the above step then repeats until no SPS PDSCH transmission occasion is left in the set of SPS configured PDSCH transmission occasions remaining in the slot after the release of the SPS configured PDSCH transmission occasion. As such, according to the procedure, of the remaining SPS configured PDSCH transmission occasions 310 and 312, the SPS configured PDSCH transmission occasion 312 that overlaps with the SPS configured PDSCH transmission occasion 310 that has the lowest configuration index (e.g., of the remaining SPS configured PDSCH transmission occasions 310 and 312) may be released or removed, as indicated by "X" and ③ to indicate that SPS configured PDSCH transmission occasion 304 is the third to be released or removed. According to the procedure, the UE can then receive transmission via the SPS configured PDSCH transmission occasion 310 (but not via the released or removed SPS configured PDSCH transmission occasion 312). FIG. 3 shows only one SPS configured PDSCH transmission occasion 312 overlapping 316 with the SPS configured PDSCH transmission occasion 310 that has the lowest configuration index of the remaining SPS configured PDSCH transmission occasions 310 and 312. However, it is to be understood that FIG. 3 is an example illustration and there can be multiple SPS configured PDSCH transmission occasions overlapping with SPS configured PDSCH transmission occasion 310, in which case all the overlapping SPS configured PDSCH transmission occasions may also be released or removed. As such, with reference to FIG. 3, the result of resolving the collisions or conflicts that arise in a slot due to SPS configured PDSCH transmission occasions overlapping with each other by first releasing the SPS PDSCH transmission occasion that is associated with the same configuration index as that of the SPS release, and then applying a SPS PDSCH collision avoidance procedure to the rest of the SPS PDSCH transmission occasions is that the UE determines non-overlapping SPS PDSCH transmission occasions 306 and 310 for receiving transmissions from the base station to which the UE is connected. That is, the UE can receive transmissions via SPS configured PDSCH transmission occasions 306 and 310, but not via the rest of the SPS configured PDSCH transmission occasions, i.e., 304, 308 and 312. In other words, the UE may not receive or expect to receive or decode transmission via SPS configured PDSCH transmission occasions 304, 308, 312 and may cancel these SPS configured PDSCH transmission occasions.

Figure 4:
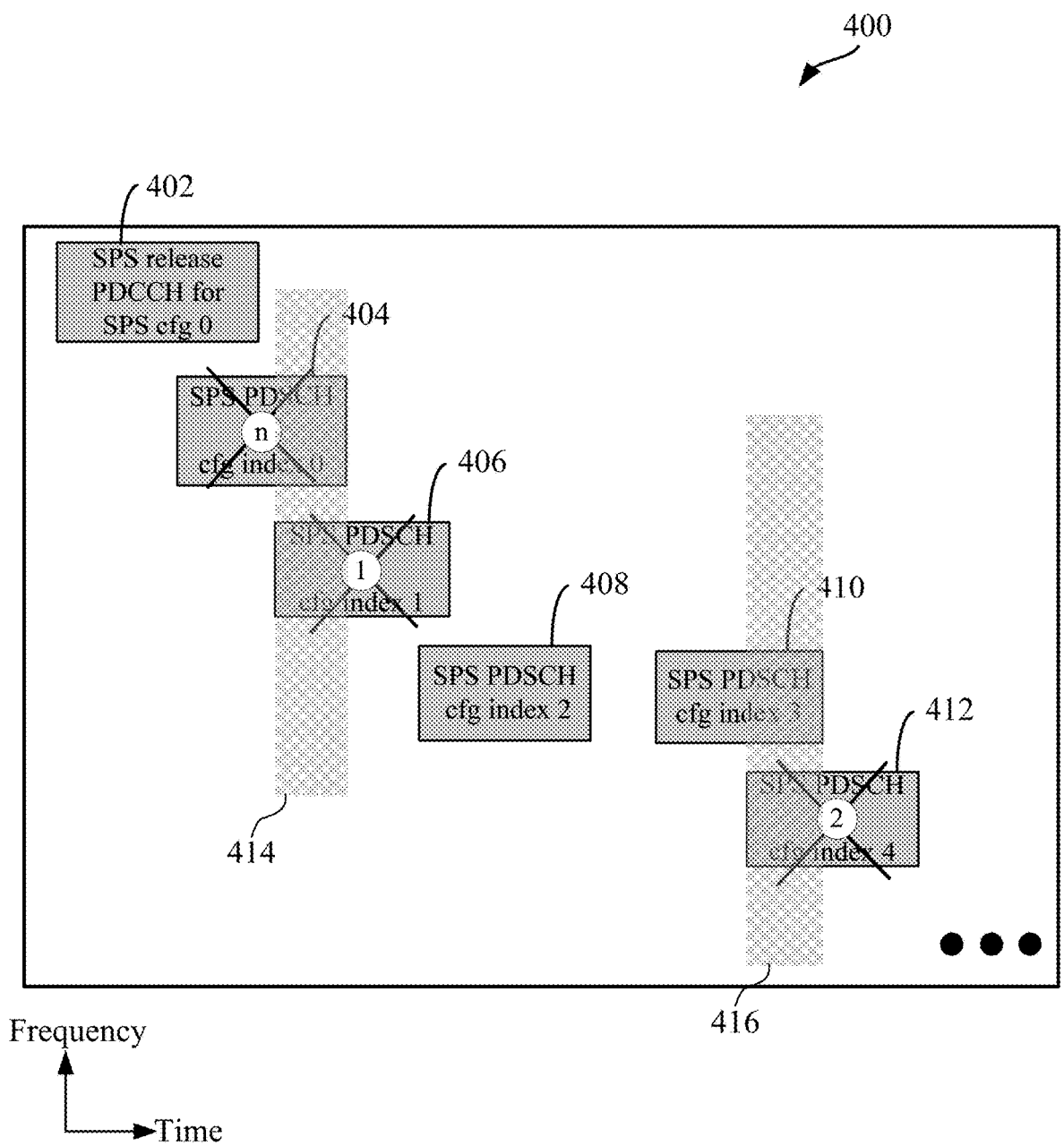
FIG. 4 illustrates an example illustration of managing overlapping SPS configured PDSCH transmission occasions, according to some aspects of the present disclosure.

FIG. 4 shows an example illustration of the management of overlapping semi-persistent scheduling (SPS) configured physical downlink shared channel (PDSCH) transmission occasions, according to some aspects of the present disclosure. In some aspects, a UE receives from a base station (BS) and via a physical downlink control channel (PDCCH), a SPS release PDCCH that is configured to release at the UE a SPS configuration. In some cases, the SPS configuration may include or be associated with a configuration index and may be configured to schedule in a slot a SPS PDSCH transmission occasion that is associated with the same configuration index. In some instances, the slot may also have multiple SPS configured PDSCH transmission occasions, also referred to as SPS PDSCH transmission occasions without corresponding PDCCH transmissions, some of which may be overlapping with each other and/or with the SPS PDSCH transmission occasion that is associated with the configuration index of the SPS release. The multiple SPS configured PDSCH transmission occasions may be configured by different SPS configurations, i.e., by SPS configurations having different configuration indices. For instance, FIG. 4 shows an example illustration of an SPS release 402 received by a UE in a slot and including or being associated with a configuration index (e.g., index=0). The SPS release may be configured to release the SPS configuration that configures the SPS PDSCH transmission occasion 404 associated with the same configuration index=0. In some aspects, the same slot may also include multiple transmission occasions 406, 408, 410 and 412, each configured by SPS configurations including or associated with different configuration indices.

In some aspects, the UE may resolve the collisions or conflicts that arise due to the SPS configured PDSCH transmission occasions overlapping with each other by first applying a SPS PDSCH collision avoidance procedure to all of the SPS PDSCH transmission occasions in the slot (e.g., including the SPS PDSCH transmission occasion that is associated with the configuration index of the SPS release and the SPS PDSCH transmission occasions without corresponding PDCCH transmissions) followed by releasing the SPS PDSCH transmission occasion that is associated with the same configuration index as that of the SPS release. In other words, if more than one PDSCH on a serving cell each without a corresponding PDCCH transmission are in a slot, after resolving overlapping with symbols in the slot indicated as uplink by tdd-UL-DL-ConfigurationCommon, or by tdd-UL-DL-ConfigurationDedicated, and before removing PDSCH(s) due to received SPS release PDCCH(s) in the slot, a UE receives one or more PDSCHs without corresponding PDCCH transmissions in the slot by applying the aforementioned SPS PDSCH collision avoidance procedure, as illustrated with reference to FIG. 4 below. The UE may then release the SPS PDSCH transmission occasion that is associated with the same configuration index as that of the SPS release, for example, if remaining after the application of the PDSCH collision avoidance procedure.

In FIG. 4, after receiving the SPS release 402 with configuration index 0, the UE may apply the SPS PDSCH collision avoidance procedure to all the SPS configured PDSCH transmission occasions in the slot, such as the SPS PDSCH transmission occasion 404 that is associated with the same configuration index as that of the SPS release, and the SPS PDSCH transmission occasions without corresponding PDCCH transmissions 406, 408, 410 and 412. The first step of the procedure is to release or remove the SPS configured PDSCH transmission occasion 406 that overlaps 414 with the SPS configured PDSCH transmission occasion 404 that has the lowest configuration index of all the SPS configured PDSCH transmission occasions 404, 406, 408, 410 and 412, as indicated with the "X" and ① to indicate that SPS configured PDSCH transmission occasion 406 is the first to be released or removed. FIG. 4 shows only one SPS configured PDSCH transmission occasion 406 overlapping 414 with the SPS configured PDSCH transmission occasion 404 that has the lowest configuration index of all the SPS configured PDSCH transmission occasions 404, 406, 408, 410 and 412. However, it is to be understood that FIG. 4 is an example illustration and there can be multiple SPS configured PDSCH transmission occasions overlapping with SPS configured PDSCH transmission occasion 404, in which case all the overlapping SPS configured PDSCH transmission occasions may also be released or removed. According to the procedure, the UE can then receive transmission via the SPS configured PDSCH transmission occasion 404, unless it is released by a SPS release (as discussed below). Transmission may not be received, however, via the released or removed SPS configured PDSCH transmission occasion 406.

After this step, there may still be additional overlapping SPS configured PDSCH transmission occasions left in the slot, such as the remaining SPS configured PDSCH transmission occasions 408, 410 and 412 (i.e., the SPS configured PDSCH transmission occasions without corresponding PDCCH that may not have overlapped with SPS configured PDSCH transmission occasion 404). In such cases, the above step then repeats until no overlapping SPS PDSCH transmission occasions are left in the slot. As such, according to the procedure, the next step is to determine if there is any SPS PDSCH transmission occasion that overlaps the SPS configured PDSCH transmission occasion 408 that has, of the remaining SPS configured PDSCH transmission occasions 408, 410 and 412, the lowest configuration index. There is no such overlapping SPS configured PDSCH transmission occasion. Further, the UE can receive transmission via the SPS configured PDSCH transmission occasion 408.

In some aspects, according to the procedure, the next step in the procedure would be to determine if there is any SPS PDSCH transmission occasion that overlaps the SPS configured PDSCH transmission occasion 410 that has, of the remaining SPS configured PDSCH transmission occasions 410 and 412, the lowest configuration index. SPS configured PDSCH transmission occasion 412 overlaps 416 with the SPS configured PDSCH transmission occasion 410 and as such may be released or removed, as indicated by "X" and ② to indicate that SPS configured PDSCH transmission occasion 412 is the second SPS configured PDSCH transmission occasion to be released or removed. According to the procedure, the UE can then receive transmission via the SPS configured PDSCH transmission occasion 410 (but not via the released or removed SPS configured PDSCH transmission occasion 412). FIG. 4 shows only one SPS configured PDSCH transmission occasion 412 overlapping 416 with the SPS configured PDSCH transmission occasion 410 that has the lowest configuration index of the remaining SPS configured PDSCH transmission occasions 410 and 412. However, it is to be understood that FIG. 4 is an example illustration and there can be multiple SPS configured PDSCH transmission occasions overlapping with SPS configured PDSCH transmission occasion 410, in which case all the overlapping SPS configured PDSCH transmission occasions may also be released or removed.

In some aspects, after the SPS PDSCH collision avoidance procedure is applied to all the SPS configured PDSCH transmission occasions in the slot (e.g., SPS configured PDSCH transmission occasions 404, 406, 408, 410 and 412), the UE may release the SPS configured PDSCH transmission occasion 404 that is associated with the configuration index 0 in response to receiving the SPS release 402, as indicated with the "X" and (n) to indicate that SPS configured PDSCH transmission occasion 404 is released after n−1 releases ore removals of SPS configured PDSCH transmission occasions that occurred as a result of the SPS PDSCH collision avoidance procedure. As such, with reference to FIG. 4, the result of resolving the collisions or conflicts that arise in a slot due to SPS configured PDSCH transmission occasions overlapping with each other by first applying the SPS PDSCH collision avoidance procedure to all of the SPS PDSCH transmission occasions in the slot (e.g., including the SPS PDSCH transmission occasion that is associated with the configuration index of the SPS release and the SPS PDSCH transmission occasions without corresponding PDCCH transmissions) followed by releasing the SPS PDSCH transmission occasion that is associated with the same configuration index as that of the SPS release is that the UE determines non-overlapping SPS PDSCH transmission occasions 408 and 410 for receiving transmissions from the base station to which the UE is connected. That is, the UE can receive transmissions via SPS configured PDSCH transmission occasions 408 and 410, but not via the rest of the SPS configured PDSCH transmission occasions, i.e., 404, 406 and 412. In other words, the UE may not receive or expect to receive or decode transmission via SPS configured PDSCH transmission occasions 404, 406 and 412 and may cancel these SPS configured PDSCH transmission occasions It is to be noted that these results are different from the results obtained with reference to FIG. 3. That is, the non-overlapping SPS configured PDSCH transmission occasions obtained by first releasing the SPS PDSCH transmission occasion that is associated with the same configuration index as that of the SPS release, and then applying the SPS PDSCH collision avoidance procedure to the rest of the SPS PDSCH transmission occasions (e.g., 306 and 310 in FIG. 3) are different from those obtained by first applying the SPS PDSCH collision avoidance procedure to all of the SPS PDSCH transmission occasions in the slot followed by releasing the SPS PDSCH transmission occasion that is associated with the same configuration index as that of the SPS release (e.g., 408 and 410 in FIG. 4).

Figure 5:
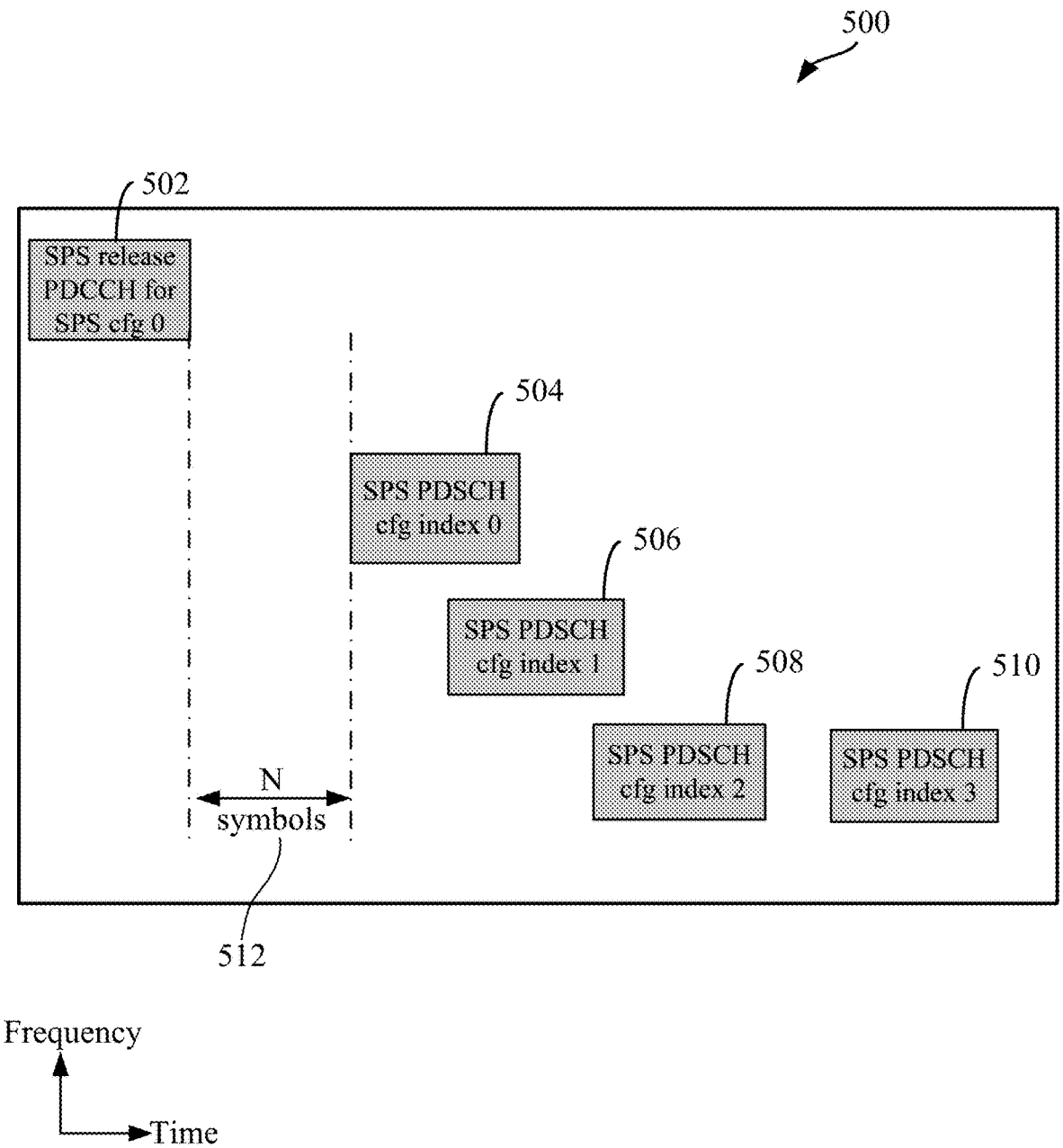
FIG. 5 illustrates an example illustration of managing overlapping SPS configured PDSCH transmission occasions, according to some aspects of the present disclosure.

FIG. 5 shows an example illustration of the management of overlapping semi-persistent scheduling (SPS) configured physical downlink shared channel (PDSCH) transmission occasions, according to some aspects of the present disclosure. In some aspects, whether a UE resolves collisions or conflicts that may arise due to overlapping SPS configured PDSCH transmission occasions by first releasing the SPS PDSCH transmission occasion that is associated with the same configuration index as that of the SPS release, and then applying a SPS PDSCH collision avoidance procedure to the SPS PDSCH transmission occasions (e.g., SPS PDSCH transmission occasions remaining after the releasing), referred as "option 1", or in the reverse order by first applying a SPS PDSCH collision avoidance procedure to all of the SPS PDSCH transmission occasions in the slot followed by releasing the SPS PDSCH transmission occasion that is associated with the same configuration index as that of the SPS release, referred as "option 2", may depend on the separation or distance between the reception of the SPS release and the earliest starting symbol of the SPS configured PDSCH transmission occasions in the slot. For example, FIG. 5 shows a UE receiving from a base station (BS) and via a physical downlink control channel (PDCCH) in a slot, a SPS release PDCCH 502 that is configured to release at the UE a SPS configuration. In some cases, the SPS configuration may include or be associated with a configuration index (e.g., 0) and may be configured to schedule in the same or subsequent slot(s) a SPS PDSCH transmission occasion 504 that is associated with the same configuration index. In some instances, the same or subsequent slot(s) may also have multiple SPS configured PDSCH transmission occasions 506, 508 and 510, which may be configured by different SPS configurations, i.e., by SPS configurations having different configuration indices.

In some aspects, the UE may choose option 1 when the SPS release 502 is received more than a threshold number of symbols N prior to the earliest starting symbol of the SPS configured PDSCH transmission occasions. That is, if the separation or distance 512 between the reception or end of the SPS release 502 and start of the first SPS PDSCH transmission occasion 504 of the multiple SPS PDSCH transmission occasions 504, 506, 508 and 510 is larger the threshold number of symbols N, then the UE may choose option 1, i.e., first releasing the SPS PDSCH transmission occasion that is associated with the same configuration index as that of the SPS release, and then applying a SPS PDSCH collision avoidance procedure to the remaining SPS PDSCH transmission occasions. On the other hand, in some aspects, the UE may choose option 2 when the SPS release 502 is received within a threshold number of symbols N prior to the earliest starting symbol of the SPS configured PDSCH transmission occasions. That is, if the separation or distance 512 between the reception or end of the SPS release 502 and start of the first SPS PDSCH transmission occasion 504 of the multiple SPS PDSCH transmission occasions 504, 506, 508 and 510 is within the threshold number of symbols N, then the UE may choose option 2, i.e., by first applying a SPS PDSCH collision avoidance procedure to all of the SPS PDSCH transmission occasions in the slot followed by releasing the SPS PDSCH transmission occasion that is associated with the same configuration index as that of the SPS release. In some aspects, as noted above, the SPS release 502 may be received in a prior slot than the slot containing the multiple SPS PDSCH transmission occasions 504, 506, 508 and 510. In some aspects, the threshold number of symbols N can be a natural number in the range from 7 to 14. For example, the threshold number of symbols N can be 7. For example, the threshold number of symbols N can be 14.

In some aspects, after identifying non-overlapping SPS configured PDSCH transmission occasions for receiving transmissions from the base station to which the UE is connected as discussed above with reference to FIG. 3, FIG. 4 or FIG. 5, the UE may not or does not expect a HARQ-ACK for the SPS release and a HARQ-ACK for the surviving SPS configured PDSCH transmission occasions (i.e., SPS configured PDSCH transmission occasions remaining after option 1 or option 2 discussed above) to map to same location in a HARQ-ACK codebook if the UE is configured with a semi-static HARQ-ACK codebook (i.e., the codebook is a type 1 HARQ-ACK codebook). That is, if the UE identifies the HARQ-ACK for the SPS release and the HARQ-ACK for one of the non-overlapping SPS configured PDSCH transmission occasions that the UE can use for transmission are scheduled to a same location in the HARQ-ACK codebook, the UE may identify that a scheduling error has occurred. For example, after identifying SPS configured PDSCH transmission occasions 306 and 310 with reference to FIG. 3 or SPS configured PDSCH transmission occasions 408 and 410 with reference to FIG. 4, a UE configured with a type-1 HARQ-ACK codebook does not expect a HARQ-ACK for the SPS release and a HARQ-ACK for either SPS configured PDSCH transmission occasions 306, 310, 408 or 410 to map to same location in a HARQ-ACK codebook. That is, the UE may identify that a scheduling error if the HARQ-ACK for the SPS release and a HARQ-ACK for any of the SPS configured PDSCH transmission occasions 306, 310, 408 and 410 map to same location in the type-1 HARQ-ACK codebook associated with the UE.

Figure 6:
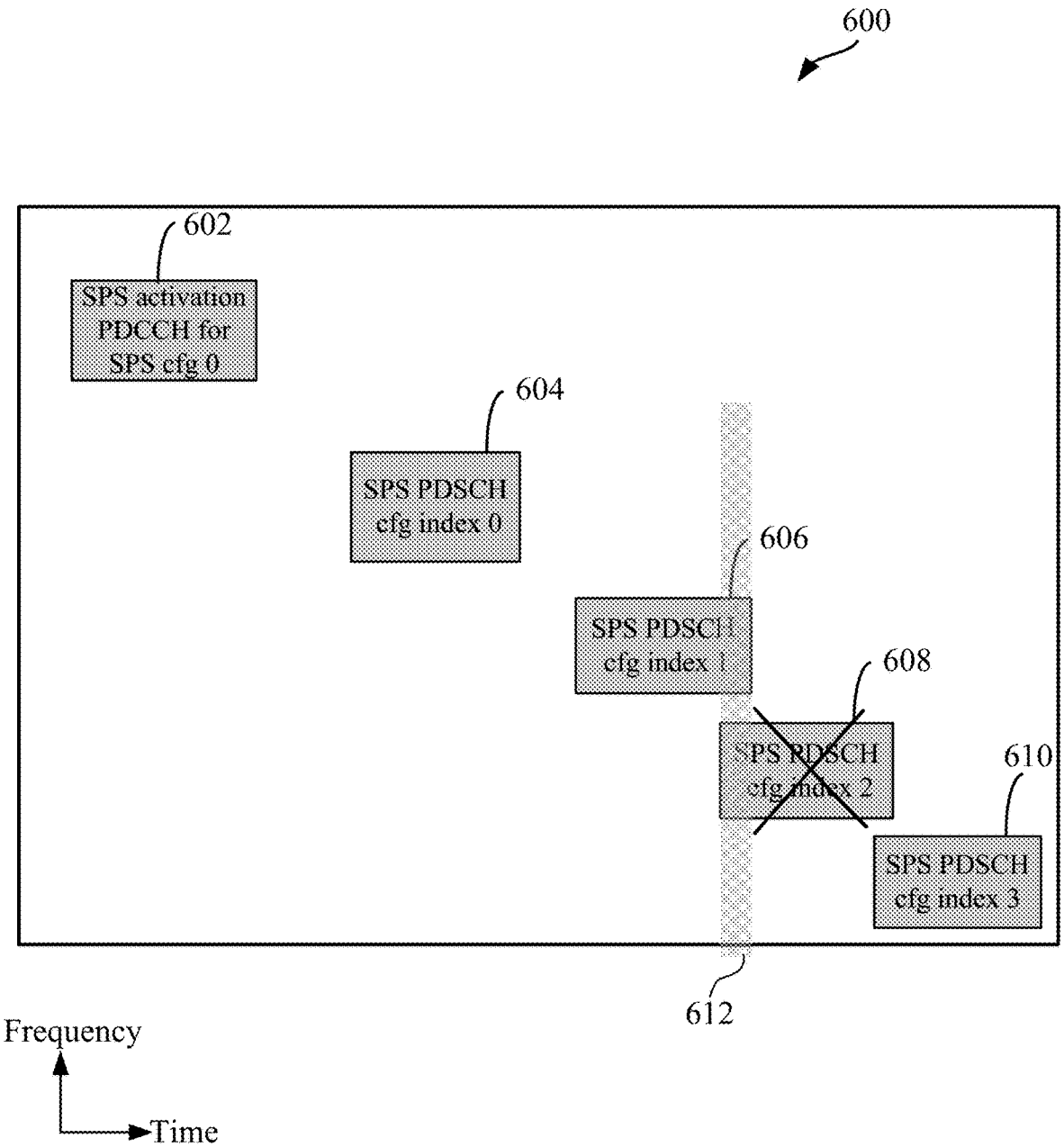
FIG. 6 illustrates an example illustration of managing overlapping SPS configured PDSCH transmission occasions, according to some aspects of the present disclosure.

FIG. 6 shows an example illustration of the management of overlapping semi-persistent scheduling (SPS) configured physical downlink shared channel (PDSCH) transmission occasions, according to some aspects of the present disclosure. In some aspects, a UE may be scheduled with multiple SPS configured PDSCH transmission occasions configured with different SPS configurations, i.e., with SPS configurations having or associated with different configuration indices. These SPS PDSCH transmission occasions may be referred as SPS PDSCH transmission occasions without corresponding PDCCH transmissions. In some cases, these SPS PDSCH transmission occasions without corresponding PDCCH transmissions may be overlapping with each other. In some aspects, the UE may also receive from a base station (BS) and via a physical downlink control channel (PDCCH), a SPS activation/reactivation PDCCH that is associated with a configuration index and configured to activate or reactivate at the UE a SPS configuration of a SPS configured PDSCH transmission occasion that is different from the multiple SPS configured PDSCH transmission occasions and is associated with the configuration index of the SPS activation/reactivation PDCCH. For example, FIG. 6 shows three SPS configured PDSCH transmission occasions 606, 608 and 610 with different configuration indices, and the UE may receive from the BS a SPS activation/reactivation PDCCH 602 including or associated with a configuration index (i.e., 0) and configured to activate or reactivate the SPS configured PDSCH transmission occasion 604 that is also associated with the same configuration index=0.

In some cases, the presence of an activated/reactivated SPS PDSCH transmission occasion having or associated with the same configuration index as the SPS activation/reactivation PDCCH (i.e., the activated or reactivated SPS configured PDSCH transmission occasion 604) in the slot with the SPS configured PDSCH transmission occasions without corresponding PDCCH transmissions (i.e., the multiple SPS configured PDSCH transmission occasions 606, 608 and 610) may change the resolution of collisions or conflicts that may arise due to the SPS configured PDSCH transmission occasions overlapping with each other (and in some cases, with the activated or reactivated SPS PDSCH transmission occasion having the same configuration index as the SPS activation/reactivation PDCCH). In other words, in some cases, the result of the UE applying a SPS PDSCH collision avoidance procedure to the SPS configured PDSCH transmission occasions without corresponding PDCCH transmissions followed by the activation or reactivation of the SPS PDSCH transmission occasion with the same configuration index as the SPS activation/reactivation PDCCH (referred herein as "option A") may be different from the result of first activating or reactivating the SPS PDSCH transmission occasion with the same configuration index as the SPS activation/reactivation PDCCH followed by applying a SPS PDSCH collision avoidance procedure to the SPS configured PDSCH transmission occasions without corresponding PDCCH transmissions and the activated or reactivated SPS PDSCH transmission occasion having the same configuration index as the SPS activation/reactivation PDCCH (referred herein as "option B"). In some cases, in particular when the activation or reactivation of the SPS PDSCH transmission occasion associated with the same configuration index as the SPS activation/reactivation PDCCH occurs within a threshold number of symbols N of the earliest starting symbol of the SPS configured PDSCH transmission occasions without corresponding PDCCH transmissions, then the UE may not have enough time to re-determine the resolution of the collisions or conflicts that may arise due to the overlapping of the SPS configured PDSCH transmission occasions in the slot. In some aspects, the threshold number of symbols N can be a natural number in the range from 7 to 14. For example, the threshold number of symbols N can be 7. For example, the threshold number of symbols N can be 14.

As such, in some aspects, unless the SPS activation/reactivation PDCCH ends at least a threshold number of symbols N prior to the earliest starting symbol of the SPS configured PDSCH transmission occasions without corresponding PDCCH transmissions and/or the presence of the activated or reactivated SPS configured PDSCH transmission occasion may not affect the resolution of the collisions or conflicts due to overlapping SPS PDSCH transmission occasions without corresponding PDCCH transmissions, the UE may not or does not decode the activated or reactivated SPS configured PDSCH transmission occasion and/or the SPS configured PDSCH transmission occasions without corresponding PDCCH transmissions. That is, the UE may not expect or does not expect to receive the SPS activation/reactivation PDCCH that ends less than or equal to N symbols prior to the earliest starting symbol of the SPS configured PDSCH transmission occasions without corresponding PDCCH transmissions if the presence of the SPS activation/reactivation PDCCH affects the resolution of the collisions or conflicts due to overlapping SPS PDSCH transmission occasions without corresponding PDCCH transmissions. In that happens, i.e., the UE receives the SPS activation/reactivation PDCCH within N symbols, then the UE may determine that a scheduling error has happened. FIG. 6 shows aspects where the presence of the activated or reactivated SPS configured PDSCH transmission occasion (i.e., the SPS configured PDSCH transmission occasion with same configuration index as that of the SPS activation/reactivation PDCCH) may not affect the resolution of collisions or conflicts by, for example, applying a SPS PDSCH collision avoidance procedure to the SPS configured PDSCH transmission occasions without corresponding PDCCH transmissions and the activated or reactivated SPS PDSCH transmission occasion having the same configuration index as the SPS activation/reactivation PDCCH.

In FIG. 6, the result of "option A", i.e., the UE applying a SPS PDSCH collision avoidance procedure to the SPS configured PDSCH transmission occasions without corresponding PDCCH transmissions 606, 608, 610 followed by the activation or reactivation of the SPS PDSCH transmission occasion 604 with the same configuration index as the SPS activation/reactivation PDCCH is the same as the result of "option B", i.e., first activating or reactivating the SPS PDSCH transmission occasion 604 with the same configuration index as the SPS activation/reactivation PDCCH followed by applying a SPS PDSCH collision avoidance procedure to the SPS configured PDSCH transmission occasions without corresponding PDCCH transmissions 606, 608, 610 and the activated or reactivated SPS PDSCH transmission occasion 604. This is because the results in both "option A" and "option B" are the same, i.e., the SPS configured PDSCH transmission occasions 604, 606 and 610 are available for transmission for the UE (e.g., the UE may or does decode these SPS configured PDSCH transmission occasions for transmission from the BS) while SPS configured PDSCH transmission occasion 608 is released for overlapping 612 with SPS PDSCH transmission occasion 606 (e.g., the UE may not or does not decode this SPS configured PDSCH transmission occasion for transmission from the BS).

Figure 7:
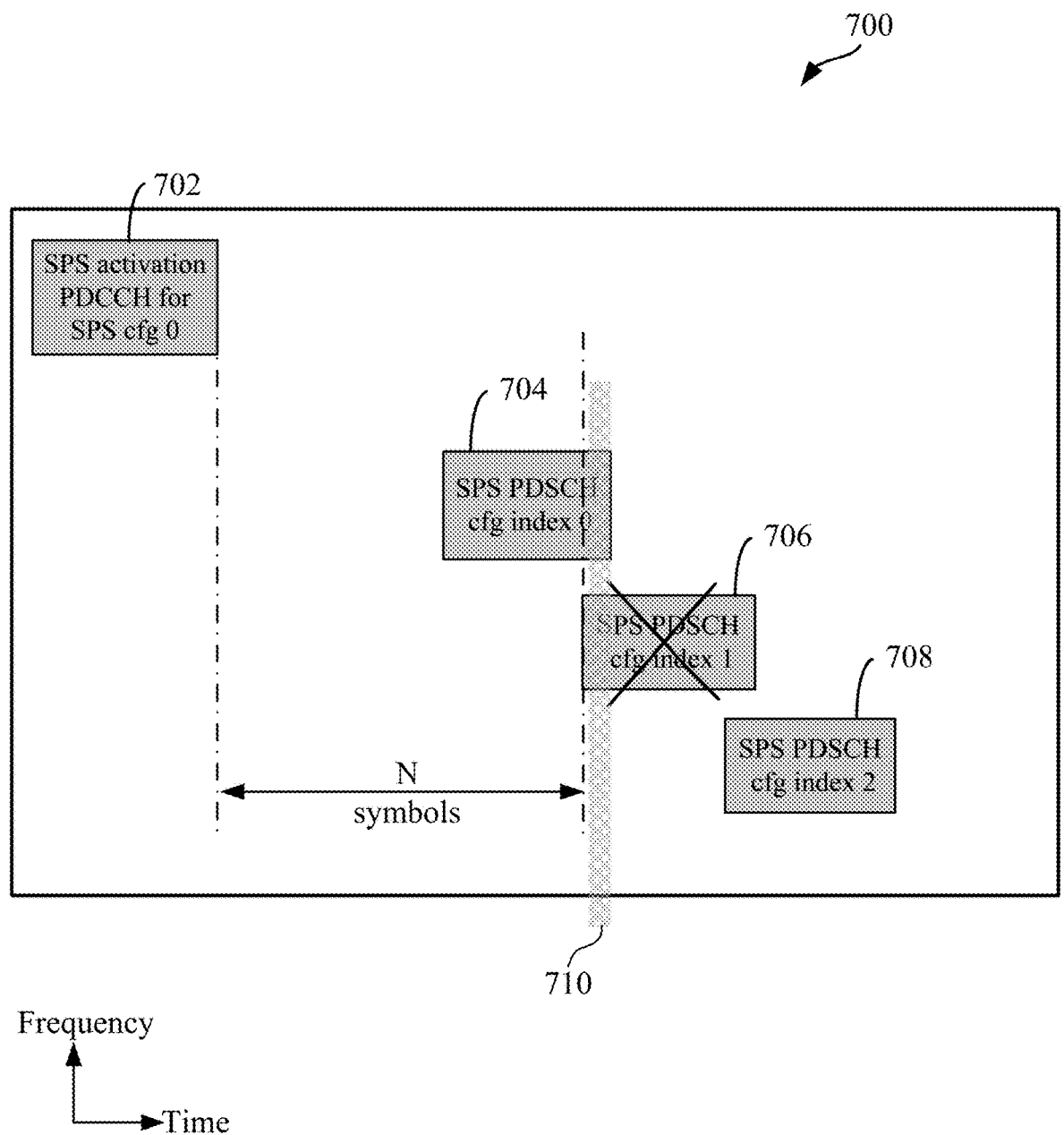
FIG. 7 illustrates an example illustration of managing overlapping SPS configured PDSCH transmission occasions, according to some aspects of the present disclosure.

FIG. 7 shows aspects where the SPS activation/reactivation PDCCH ends at least a threshold number of symbols N prior to the earliest starting symbol of the SPS configured PDSCH transmission occasions without corresponding PDCCH transmissions. That is, the separation or distance between the reception of the SPS activation/reactivation PDCCH 702 and the earliest starting symbol of the SPS configured PDSCH transmission occasion 706 of the SPS configured PDSCH transmission occasions without corresponding PDCCH transmissions 706, 708 is at least the threshold number of symbols N. In such cases, the UE may apply a SPS PDSCH collision avoidance procedure to the SPS configured PDSCH transmission occasions without corresponding PDCCH transmissions 706, 708 as well as the activated or reactivated SPS PDSCH transmission occasion 704. In the example aspect shown in FIG. 7, according to the first step of the procedure, the UE releases or removes SPS configured PDSCH transmission occasion 706 that overlaps with the SPS PDSCH transmission occasion 704 that has or is associated with the smallest configuration index (i.e., 0), leaving SPS PDSCH transmission occasions 704 and 708 for transmission for the UE.

In some aspects, if the SPS activation/reactivation PDCCH ends within a threshold number of symbols N of the earliest starting symbol of the SPS configured PDSCH transmission occasions without corresponding PDCCH transmissions, i.e., if the separation or distance between the reception of the SPS activation/reactivation PDCCH 702 and the earliest starting symbol of the SPS configured PDSCH transmission occasion 706 of the SPS configured PDSCH transmission occasions without corresponding PDCCH transmissions 706, 708 is less than the threshold number of symbols N, the UE may not or does not decode the activated or reactivated SPS configured PDSCH transmission occasion 704 and/or the SPS configured PDSCH transmission occasions without corresponding PDCCH transmissions 706, 708. In some aspects, the reason the UE may not or does not expect to decode the activated or reactivated SPS configured PDSCH transmission occasion 704 when the separation or distance is less than the threshold number of symbols N may be because the activated or reactivated SPS configured PDSCH transmission occasion 704 overlaps with SPS configured PDSCH transmission occasion 706, which would not have been released or removed as a result of the SPS PDSCH collision avoidance procedure if the activated or reactivated SPS configured PDSCH transmission occasion 704 were not present in the slot. In some aspects, the threshold number of symbols N can be a natural number in the range from 7 to 14. For example, the threshold number of symbols N can be 7.

Figure 8:
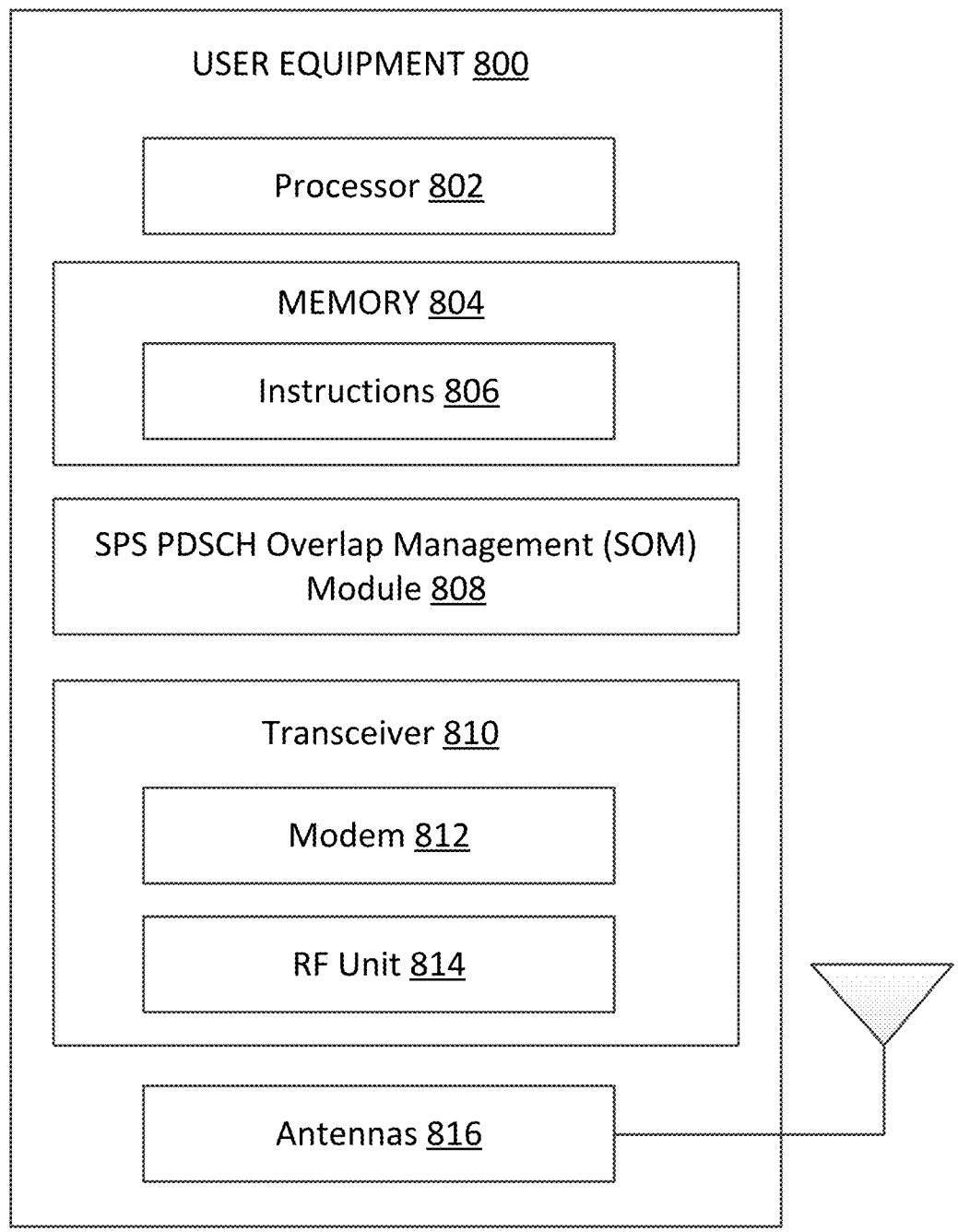
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 in the network 100 as discussed above in FIG. 1 as discussed above in FIG. 1. As shown, the UE 800 may include a processor 802, a memory 804, a SPS PDSCH overlap management (SOM) module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-7. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SOM module 808 may be implemented via hardware, software, or combinations thereof. For example, the SOM module 808 may be implemented as a processor, circuit, and/or instructions 806 stored in the memory 804 and executed by the processor 802. In some examples, the SOM module 808 can be integrated within the modem subsystem 812. For example, the SOM module 808 can be implemented by a combination of software components (e.g., executed by a DSP or a general processor) and hardware components (e.g., logic gates and circuitry) within the modem subsystem 812. The SOM module 808 may be used for various aspects of the present disclosure, for example, aspects of FIGS. 1-7. The SOM module 808 can be configured to identify a plurality of semi-persistent scheduling (SPS) physical downlink shared channel (PDSCH) transmission occasions in a slot and receiving, from a base station (BS) and via a physical downlink control channel (PDCCH), a semi-persistent scheduling (SPS) release configured to release at the UE a SPS configuration including a configuration index. In some aspects, the SPS configuration may be configured to schedule, of the plurality of SPS PDSCH transmission occasions in the slot, a SPS PDSCH transmission occasion associated with the configuration index. The SOM module 808, in response to the receiving the SPS release, may perform a first action that is releasing the SPS PDSCH transmission occasion associated with the configuration index followed by applying a first SPS PDSCH transmission occasions collision avoidance procedure to a first set of SPS PDSCH transmission occasions, wherein the first set of SPS PDSCH transmission occasions may include SPS PDSCH transmission occasions of the plurality of SPS PDSCH transmission occasions remaining after the releasing the SPS PDSCH transmission occasion associated with the configuration index. Alternatively, the SOM module 808, in response to the receiving the SPS release, may perform a second action that is applying a second SPS PDSCH transmission occasions collision avoidance procedure to a second set of SPS PDSCH transmission occasions followed by releasing the SPS PDSCH transmission occasion associated with the configuration index, wherein the second set of SPS PDSCH transmission occasions may include the plurality of SPS PDSCH transmission occasions.

In some aspects, the SOM module 808 may identify one or more semi-persistent scheduling (SPS) physical downlink shared channel (PDSCH) transmission occasions in a slot and receiving, from a base station (BS) and via a physical downlink control channel (PDCCH), a semi-persistent scheduling (SPS) activation downlink control information (DCI) configured to activate at the UE a SPS configuration. In some aspects, the SPS configuration may include a configuration index and configured to schedule a SPS PDSCH transmission occasion associated with the configuration index. In some aspects, the SOM module 808 may activate or reactivate, in response to the receiving the SPS activation, the SPS PDSCH transmission occasion associated with the configuration index based on i) a separation in symbols between an end of the SPS activation DCI and a start of an earliest SPS PDSCH transmission occasion of the one or more of SPS PDSCH transmission occasions in a same slot as the SPS PDSCH transmission occasion associated with the configuration index; or ii) a comparison of a first result of applying a first SPS PDSCH transmission occasions collision avoidance procedure and a second result of applying a second SPS PDSCH transmission occasions collision avoidance procedure, wherein the first SPS PDSCH transmission occasions collision avoidance procedure is applied to a first set of SPS PDSCH transmission occasions including the one or more SPS PDSCH transmission occasions, and the second SPS PDSCH transmission occasions collision avoidance procedure is applied to a second set of SPS PDSCH transmission occasions including the SPS PDSCH transmission occasion associated with the configuration index and the one or more SPS PDSCH transmission occasions.

As shown, the transceiver 810 may include the modem subsystem 812 and the RF unit 814. The transceiver 810 can be configured to communicate bi-directionally with other devices, such as the UEs 115, and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at a UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PSCCH, PSSCH, PSFCH, measurement data, and/or sensor data records) to the SOM module 808 for processing. The antennas 816 may include multiple antennas of similar or different designs in order to sustain multiple transmission links.

In some aspects, the transceiver 810 is configured to communicate with the base station to receive, from a base station (BS) and via a physical downlink control channel (PDCCH), a semi-persistent scheduling (SPS) release configured to release at the UE a SPS configuration including a configuration index, wherein the SPS configuration is configured to schedule, of the plurality of SPS PDSCH transmission occasions in the slot, a SPS PDSCH transmission occasion associated with the configuration index. In some aspects, the transceiver 810 is configured to communicate with the base station to receive receiving, from a base station (BS) and via a physical downlink control channel (PDCCH), a semi-persistent scheduling (SPS) activation downlink control information (DCI) configured to activate at the UE a SPS configuration, wherein the SPS configuration including a configuration index and configured to schedule a SPS PDSCH transmission occasion associated with the configuration index.

In an aspect, the UE 1300 can include multiple transceivers 510 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 9:
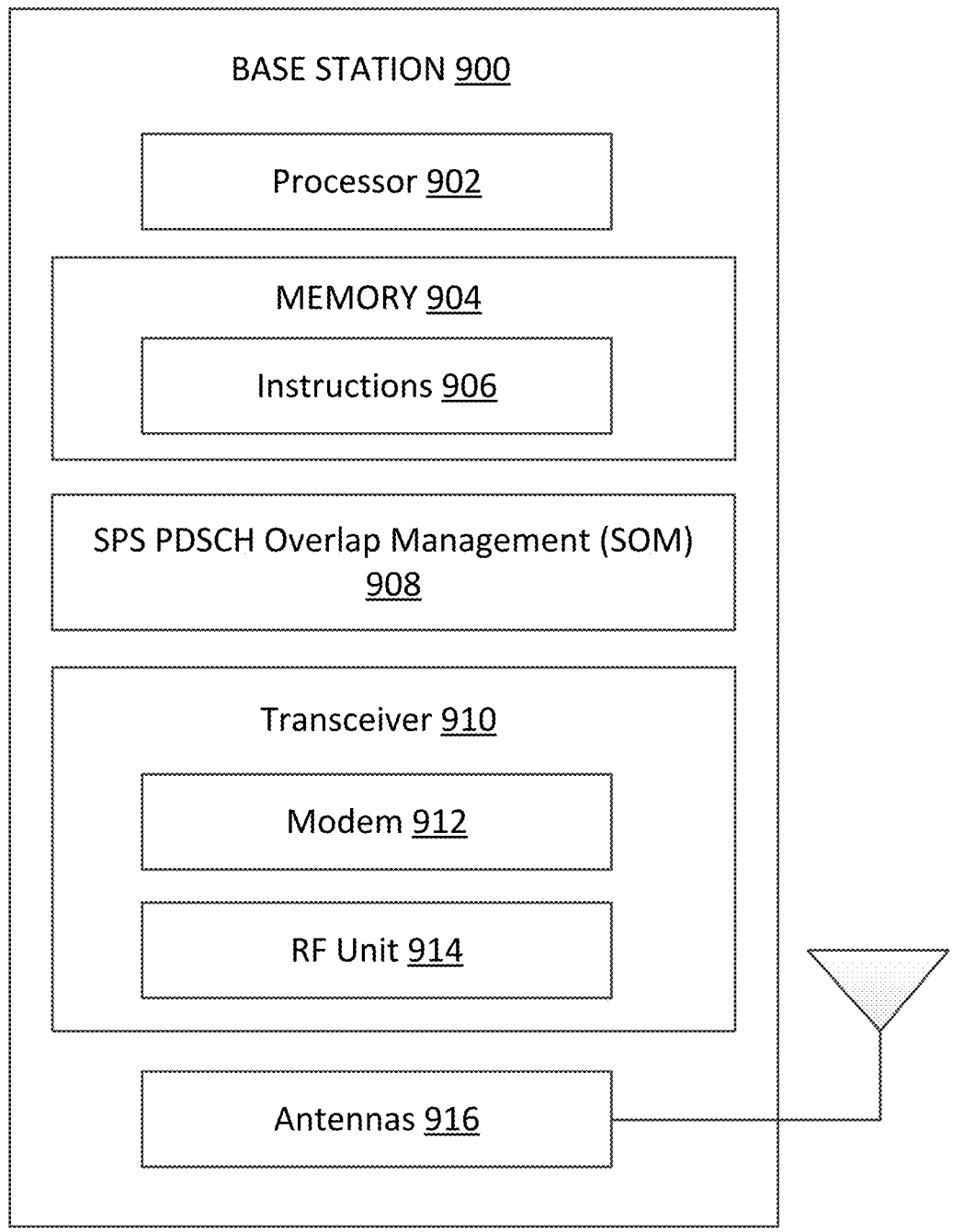
FIG. 9 is a block diagram of an exemplary base station (BS) according to aspects of the present disclosure.

FIG. 9 is a block diagram of an exemplary base station (BS) 900 according to some aspects of the present disclosure. The BS 900 may be a BS 105 discussed above in FIG. 1. As shown, the BS 900 may include a processor 902, a memory 904, a SOM module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein in connection with aspects of the present disclosure, for example, aspects of FIGS. 1-7. Instructions 906 may also be referred to as program code, which may be interpreted broadly to include any type of computer-readable statement(s) as discussed above with respect to FIG. 6.

The SOM module 908 may be implemented via hardware, software, or combinations thereof. For example, the SOM module 908 may be implemented as a processor, circuit, and/or instructions 906 stored in the memory 904 and executed by the processor 902. In some examples, the SOM module 908 can be integrated within the modem subsystem 712. For example, the SOM module 708 can be implemented by a combination of software components (e.g., executed by a DSP or a general processor) and hardware components (e.g., logic gates and circuitry) within the modem subsystem 912. The SOM module 908 may be used for various aspects of the present disclosure, for example, aspects of FIGS. 1-7.

As shown, the transceiver 910 may include a modem subsystem 912 and an RF unit 914. The transceiver 910 can be configured to communicate bi-directionally with other devices, such as the BSs 105. The modem subsystem 912 may be configured to modulate and/or encode the data from the memory 904 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PUSCH signal, UL data, SRSs, UE capability reports, RI reports) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the BS 900 to enable the BS 900 to communicate with other devices.

The RF unit 914 may provide modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDSCH signal, PDCCH, DL data, SRS resource configuration, SRS resource activation, SRS resource deactivation) to the SOM module 908. The antennas 916 may include multiple antennas of similar or different designs in order to sustain multiple transmission links. The RF unit 914 may configure the antennas 916.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 410 can include various components, where different combinations of components can implement different RATs.

Figure 10:
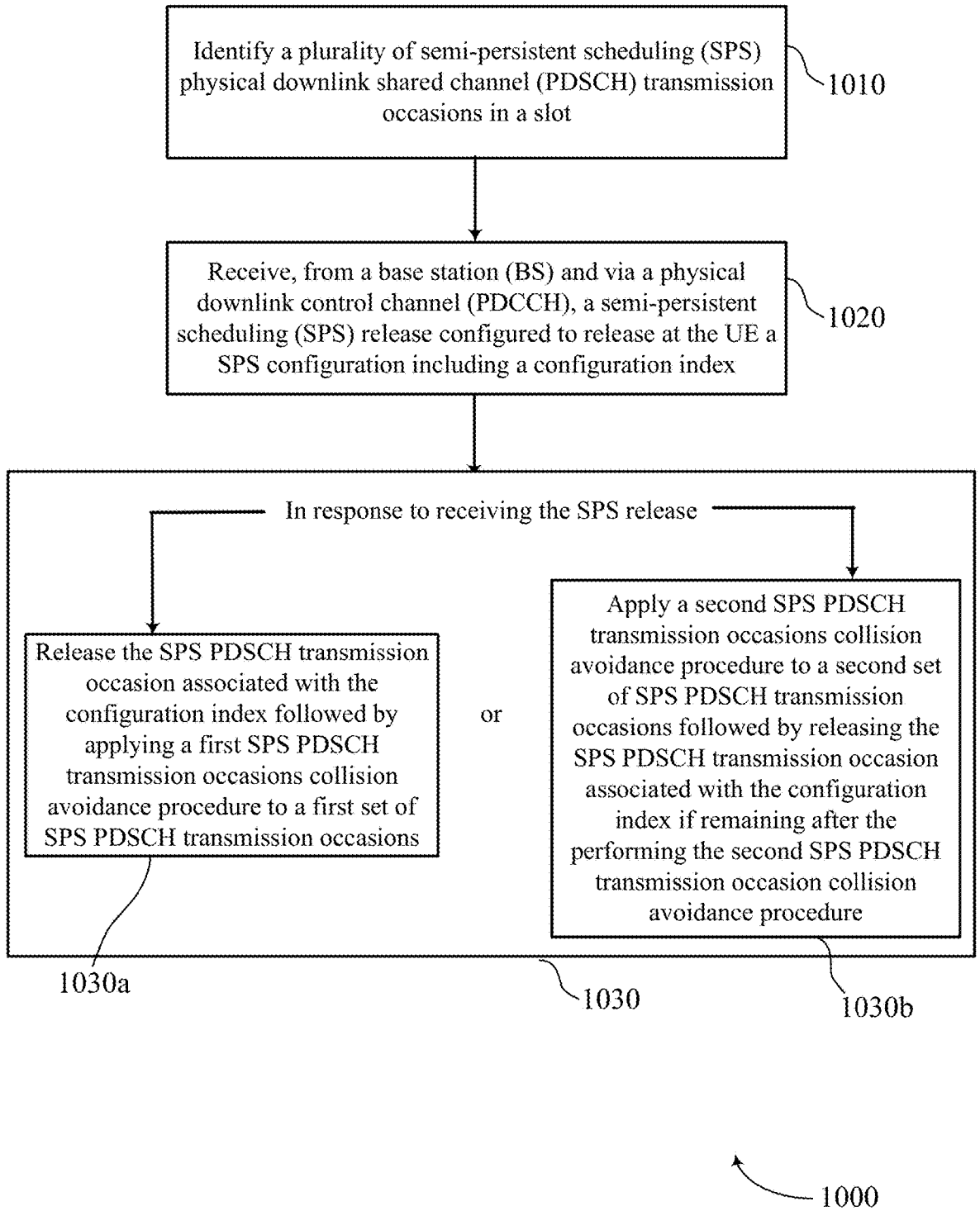
FIG. 10 illustrates a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 802, the memory 804, the SOM module 808, the transceiver 810, the modem 812, and the one or more antennas 816, to execute the steps of method 1000. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE (e.g., the UEs 115) can identify a plurality of semi-persistent scheduling (SPS) physical downlink shared channel (PDSCH) transmission occasions in a slot. In some instances, the UE may utilize one or more components, such as the processor 802, the memory 804, the SOM module 808, the transceiver 810, the modem 812, and the one or more antennas 816, to identify a plurality of semi-persistent scheduling (SPS) physical downlink shared channel (PDSCH) transmission occasions in a slot.

At block 1020, the UE can receive, from a base station (BS) and via a physical downlink control channel (PDCCH), a semi-persistent scheduling (SPS) release configured to release at the UE a SPS configuration including a configuration index. In some aspects, the SPS configuration may be configured to schedule, of the plurality of SPS PDSCH transmission occasions in the slot, a SPS PDSCH transmission occasion associated with the configuration index. In some instances, the UE may utilize one or more components, such as the processor 802, the memory 804, the SOM module 808, the transceiver 810, the modem 812, and the one or more antennas 816, to receive, from a base station (BS) and via a physical downlink control channel (PDCCH), a semi-persistent scheduling (SPS) release configured to release at the UE a SPS configuration including a configuration index.

At block 1030, a UE (e.g., the UEs 115) can perform, in response to the receiving the SPS release, one of two actions. The first action, at block 1030a, includes releasing the SPS PDSCH transmission occasion associated with the configuration index followed by applying a first SPS PDSCH transmission occasions collision avoidance procedure to a first set of SPS PDSCH transmission occasions. In some aspects, the first set of SPS PDSCH transmission occasions includes SPS PDSCH transmission occasions of the plurality of SPS PDSCH transmission occasions remaining after the releasing the SPS PDSCH transmission occasion associated with the configuration index. The second action, at block 1030b, includes applying a second SPS PDSCH transmission occasions collision avoidance procedure to a second set of SPS PDSCH transmission occasions followed by releasing the SPS PDSCH transmission occasion associated with the configuration index. In some aspects, the second set of SPS PDSCH transmission occasions includes. the plurality of SPS PDSCH transmission occasions. In some instances, the UE may utilize one or more components, such as the processor 802, the memory 804, the SOM module 808, the transceiver 810, the modem 812, and the one or more antennas 816, to perform the actions of blocks 1030a and 1030b.

In some aspects of method 1000, the UE may perform the first action in response to the receiving the SPS release when the SPS release is received at least a threshold number of symbols prior to a start of an earliest SPS PDSCH transmission occasion of the plurality of SPS PDSCH transmission occasions. Further, the threshold number of symbols can be 14. In some aspects, the UE performs the second action when the SPS release is received less than N symbols prior to a start of an earliest SPS PDSCH transmission occasion of the plurality of SPS PDSCH transmission occasions. Further, the SPS release can be received in a slot prior to a slot containing the plurality of SPS PDSCH transmission occasions.

In some aspects, a hybrid automatic request (HARQ) acknowledgment (ACK) for the SPS release is transmitted on a location in a HARQ-ACK codebook that is different from those locations for the plurality of SPS PDSCH transmission occasions. That is, in some instances, no hybrid automatic request (HARQ) acknowledgment (ACK) for the SPS release is transmitted on a location in a HARQ-ACK codebook that is same as a location in the HARQ-ACK codebook for transmitting a HARQ-ACK for any SPS PDSCH transmission occasion of the plurality of SPS PDSCH transmission occasions remaining after the performing the first action or the performing the second action, or vice versa. In some aspects, the HARQ-ACK codebook is a type-1 HARQ-ACK codebook. Some aspects of method 1000 further comprise determining that a hybrid automatic request (HARQ) acknowledgment (ACK) for the SPS release is scheduled on a location in a HARQ-ACK codebook that is same as a location in the HARQ-ACK codebook scheduled for a HARQ-ACK for any SPS PDSCH transmission occasion of the plurality of SPS PDSCH transmission occasions remaining after the performing the first action or the performing the second action; and identifying, in response to the determining, that a HARQ-ACK scheduling error has occurred.

In some aspects of method 1000, the applying the first SPS PDSCH transmission occasions collision avoidance procedure to the first set of SPS PDSCH transmission occasions includes releasing a SPS PDSCH transmission occasion of the first set of SPS PDSCH transmission occasions that overlaps with a SPS PDSCH transmission occasion, of the first set of SPS PDSCH transmission occasions, associated with a smallest configuration index. Further, the applying the second SPS PDSCH transmission occasions collision avoidance procedure to the second set of SPS PDSCH transmission occasions includes releasing a SPS PDSCH transmission occasion of the second SPS PDSCH transmission occasions that overlaps with a SPS PDSCH transmission occasion, of the second set of SPS PDSCH transmission occasions, associated with a smallest configuration index. In addition, the second action includes applying the second SPS PDSCH transmission occasions collision avoidance procedure to the second set of SPS PDSCH transmission occasions followed by releasing the SPS PDSCH transmission occasion associated with the configuration index if remaining after the performing the second SPS PDSCH transmission occasion collision avoidance procedure.

Figure 11:
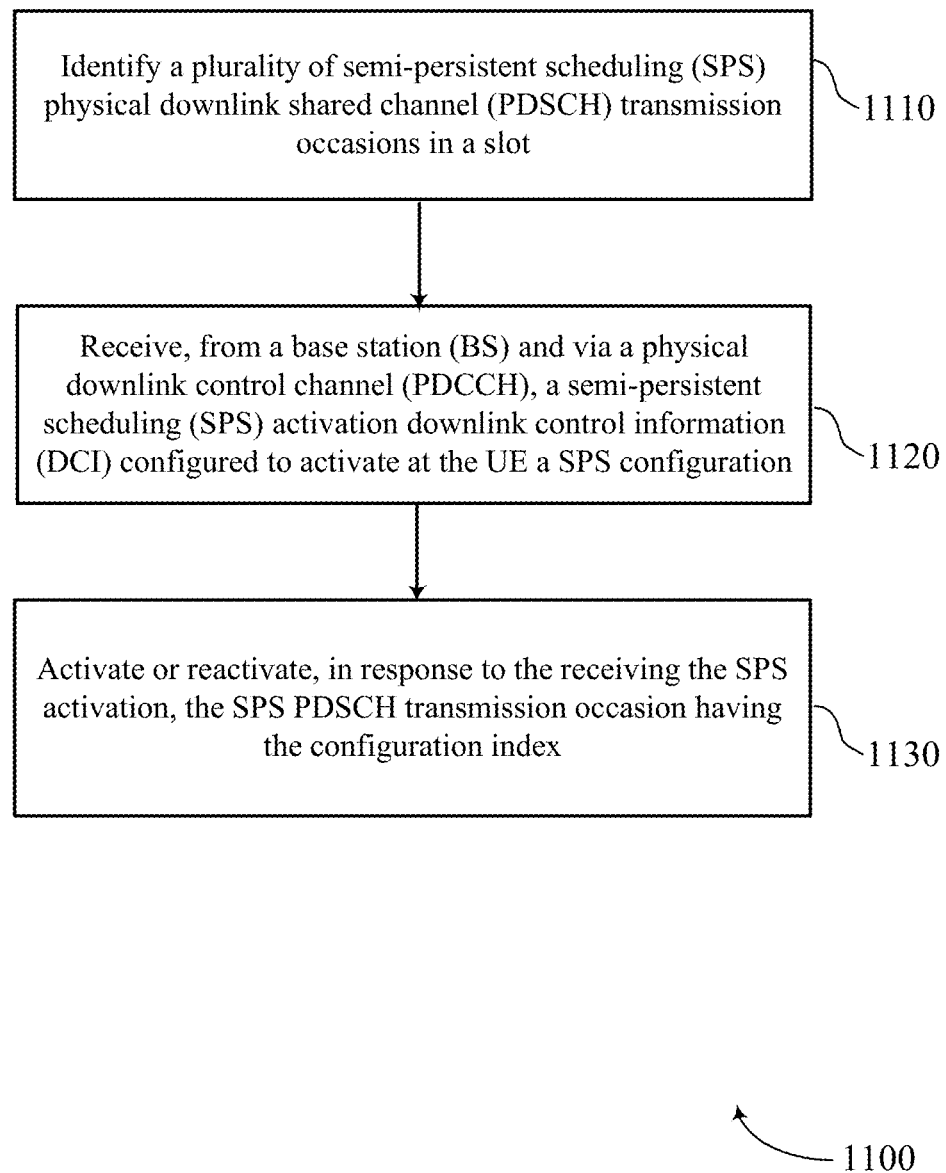
FIG. 11 illustrates a flow diagram of a wireless communication method according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 1302, the memory 1304, the SPS Release module 1308, the transceiver 1310, the modem 1312, and the one or more antennas 1316, to execute the steps of method 1100. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a UE (e.g., the UEs 115) can identify a plurality of semi-persistent scheduling (SPS) physical downlink shared channel (PDSCH) transmission occasions in a slot. In some instances, the UE may utilize one or more components, such as the processor 802, the memory 804, the SOM module 808, the transceiver 810, the modem 812, and the one or more antennas 816, to identify a plurality of semi-persistent scheduling (SPS) physical downlink shared channel (PDSCH) transmission occasions in a slot.

At block 1120, the UE can receiving, from a base station (BS) and via a physical downlink control channel (PDCCH), a semi-persistent scheduling (SPS) activation downlink control information (DCI) configured to activate at the UE a SPS configuration. In some aspects, the SPS configuration includes a configuration index and configured to schedule a SPS PDSCH transmission occasion associated with the configuration index. In some instances, the UE may utilize one or more components, such as the processor 802, the memory 804, the SOM module 808, the transceiver 810, the modem 812, and the one or more antennas 816, to determine, in response to the receiving the SPS release, whether data transmission is received via at least one of the plurality of SPS PDSCH transmission occasions.

At block 1130, the UE can activate or reactivate, in response to the receiving the SPS activation, the SPS PDSCH transmission occasion associated with the configuration index based on (i) a separation in symbols between an end of the SPS activation DCI and a start of an earliest SPS PDSCH transmission occasion of a plurality of SPS PDSCH transmission occasions in a same slot as the SPS PDSCH transmission occasion associated with the configuration index, or (ii) a comparison of a first result of applying a first SPS PDSCH transmission occasions collision avoidance procedure and a second result of applying a second SPS PDSCH transmission occasions collision avoidance procedure, wherein the first SPS PDSCH transmission occasions collision avoidance procedure applied to a first set of SPS PDSCH transmission occasions including the plurality of SPS PDSCH transmission occasions and the second SPS PDSCH transmission occasions collision avoidance procedure applied to a second set of SPS PDSCH transmission occasions including the SPS PDSCH transmission occasion associated with the configuration index and the plurality of SPS PDSCH transmission occasions. In some instances, the UE may utilize one or more components, such as the processor 802, the memory 804, the SOM module 808, the transceiver 810, the modem 812, and the one or more antennas 816, to determine, in response to the receiving the SPS release, whether data transmission is received via at least one of the plurality of SPS PDSCH transmission occasions.

In some aspects of method 1100, the activating or reactivating based on the separation in symbols includes activating or reactivating the SPS PDSCH transmission occasion associated with the configuration index when the separation in symbols is no less than a threshold number of symbols. Method 1100 may further comprise determining that the separation in symbols between the end of the SPS activation DCI and the start of the earliest SPS PDSCH transmission occasion is less than a threshold number of symbols; and identifying, in response to the determining, that a SPS PDSCH transmission occasion scheduling error has occurred. In some aspects, wherein the threshold number of symbols is 14. In some aspects, the activating or reactivating based on the comparison of the first result and the second result includes activating or reactivating the SPS PDSCH transmission occasion associated with the configuration index when the comparison indicates that the first result is the same as the second result.

Recitations of Some Aspects of the Present Disclosure

Aspect 1: A method of wireless communication performed by a user equipment (UE), the method comprising: identifying a plurality of semi-persistent scheduling (SPS) physical downlink shared channel (PDSCH) transmission occasions in a slot; receiving, from a base station (BS) and via a physical downlink control channel (PDCCH), a semi-persistent scheduling (SPS) release configured to release at the UE a SPS configuration including a configuration index, the SPS configuration configured to schedule, of the plurality of SPS PDSCH transmission occasions in the slot, a SPS PDSCH transmission occasion associated with the configuration index; and in response to the receiving the SPS release, performing: a first action that is releasing the SPS PDSCH transmission occasion associated with the configuration index followed by applying a first SPS PDSCH transmission occasions collision avoidance procedure to a first set of SPS PDSCH transmission occasions, the first set of SPS PDSCH transmission occasions including SPS PDSCH transmission occasions of the plurality of SPS PDSCH transmission occasions remaining after the releasing the SPS PDSCH transmission occasion associated with the configuration index; or a second action that is applying a second SPS PDSCH transmission occasions collision avoidance procedure to a second set of SPS PDSCH transmission occasions followed by releasing the SPS PDSCH transmission occasion associated with the configuration index, the second set of SPS PDSCH transmission occasions including the plurality of SPS PDSCH transmission occasions.

Aspect 2: The method of aspect 1, wherein the UE performs the first action in response to the receiving the SPS release when the SPS release is received at least a threshold number of symbols prior to a start of an earliest SPS PDSCH transmission occasion of the plurality of SPS PDSCH transmission occasions.

Aspect 3: The method of aspect 2, wherein the threshold number of symbols is 14.

Aspect 4: The method of any of aspects 1-3, wherein the UE performs the second action when the SPS release is received less than N symbols prior to a start of an earliest SPS PDSCH transmission occasion of the plurality of SPS PDSCH transmission occasions.

Aspect 5: The method of any of aspects 1-4, wherein the SPS release is received in a slot prior to a slot containing the plurality of SPS PDSCH transmission occasions.

Aspect 6: The method of any of aspects 1-5, wherein a hybrid automatic request (HARQ) acknowledgment (ACK) for the SPS release is transmitted on a location in a HARQ-ACK codebook that is different from those locations for the plurality of SPS PDSCH transmission occasions.

Aspect 7: The method of any of aspects 1-6, further comprising: determining that a hybrid automatic request (HARQ) acknowledgment (ACK) for the SPS release is scheduled on a location in a HARQ-ACK codebook that is same as a location in the HARQ-ACK codebook scheduled for a HARQ-ACK for any SPS PDSCH transmission occasion of the plurality of SPS PDSCH transmission occasions remaining after the performing the first action or the performing the second action; and identifying, in response to the determining, that a HARQ-ACK scheduling error has occurred.

Aspect 8: The method of aspect 6 or 7, wherein the HARQ-ACK codebook is a type-1 HARQ-ACK codebook.

Aspect 9: The method of any of aspects 1-8, wherein the applying the first SPS PDSCH transmission occasions collision avoidance procedure to the first set of SPS PDSCH transmission occasions includes releasing a SPS PDSCH transmission occasion of the first set of SPS PDSCH transmission occasions that overlaps with a SPS PDSCH transmission occasion, of the first set of SPS PDSCH transmission occasions, associated with a smallest configuration index.

Aspect 10: The method of any of aspects 1-9, wherein the applying the second SPS PDSCH transmission occasions collision avoidance procedure to the second set of SPS PDSCH transmission occasions includes releasing a SPS PDSCH transmission occasion of the second SPS PDSCH transmission occasions that overlaps with a SPS PDSCH transmission occasion, of the second set of SPS PDSCH transmission occasions, associated with a smallest configuration index.

Aspect 11: The method of any of aspects 1-10, wherein the second action includes applying the second SPS PDSCH transmission occasions collision avoidance procedure to the second set of SPS PDSCH transmission occasions followed by releasing the SPS PDSCH transmission occasion associated with the configuration index if remaining after the performing the second SPS PDSCH transmission occasion collision avoidance procedure.

Aspect 12: A method of wireless communication performed by a user equipment (UE), the method comprising: identifying one or more semi-persistent scheduling (SPS) physical downlink shared channel (PDSCH) transmission occasions in a slot; receiving, from a base station (BS) and via a physical downlink control channel (PDCCH), a semi-persistent scheduling (SPS) activation downlink control information (DCI) configured to activate at the UE a SPS configuration, the SPS configuration including a configuration index and configured to schedule a SPS PDSCH transmission occasion associated with the configuration index; and activating or reactivating, in response to the receiving the SPS activation, the SPS PDSCH transmission occasion associated with the configuration index based on: a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure, the first SPS PDSCH transmission occasions collision avoidance procedure applied to a first set of SPS PDSCH transmission occasions including the one or more SPS PDSCH transmission occasions; and the second SPS PDSCH transmission occasions collision avoidance procedure applied to a second set of SPS PDSCH transmission occasions including the SPS PDSCH transmission occasion associated with the configuration index and the one or more SPS PDSCH transmission occasions.

Aspect 13: The method of aspect 12, wherein the activating or reactivating based on the separation in symbols includes activating or reactivating the SPS PDSCH transmission occasion associated with the configuration index when the separation in symbols is no less than a threshold number of symbols.

Aspect 14: The method of aspect 12 or 13, further comprising: determining that the separation in symbols between the end of the SPS activation DCI and the start of the earliest SPS PDSCH transmission occasion is less than a threshold number of symbols; and identifying, in response to the determining, that a scheduling error has occurred.

Aspect 15: The method of aspect 13 or 14, wherein the threshold number of symbols is 14.

Aspect 16: The method of any of aspects 12-15, wherein the activating or reactivating based on the comparison of the first result and the second result includes activating or reactivating the SPS PDSCH transmission occasion associated with the configuration index when the comparison indicates that the first result is the same as the second result.

Aspect 17: The method of any of aspects 12-16, further comprising identifying a scheduling error has occurred when the first result differs from the second result.

Aspect 18: A user equipment (UE), comprising: a memory; a processor coupled to the memory; and a transceiver coupled to the processor, the UE configured to perform the methods of aspects 1-11.

Aspect 19: A user equipment (UE), comprising: a memory; a processor coupled to the memory; and a transceiver coupled to the processor, the UE configured to perform the methods of aspects 12-17.

Aspect 20: A user equipment (UE) comprising means for performing the methods of aspects 1-11.

Aspect 21: A user equipment (UE) comprising means for performing the methods of aspects 12-17.

Aspect 22: A non-transitory computer-readable medium (CRM) having program code recorded thereon, the program code comprises code for causing a UE to perform the methods of aspects 1-11.

Aspect 23: A non-transitory computer-readable medium (CRM) having program code recorded thereon, the program code comprises code for causing a UE to perform the methods of aspects 12-17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), the method comprising:
   identifying a plurality of semi-persistent scheduling (SPS) physical downlink shared channel (PDSCH) transmission occasions in a slot;
   receiving, from a base station (BS) and via a physical downlink control channel (PDCCH), a semi-persistent scheduling (SPS) release configured to release at the UE a SPS configuration including a configuration index,
   the SPS configuration configured to schedule, of the plurality of SPS PDSCH transmission occasions in the slot, a SPS PDSCH transmission occasion associated with the configuration index; and
   in response to the receiving the SPS release, performing:
   a first action that is releasing the SPS PDSCH transmission occasion associated with the configuration index followed by applying a first SPS PDSCH transmission occasions collision avoidance procedure to a first set of SPS PDSCH transmission occasions,
   the first set of SPS PDSCH transmission occasions including SPS PDSCH transmission occasions of the plurality of SPS PDSCH transmission occasions remaining after the releasing the SPS PDSCH transmission occasion associated with the configuration index; or
   a second action that is applying a second SPS PDSCH transmission occasions collision avoidance procedure to a second set of SPS PDSCH transmission occasions followed by releasing the SPS PDSCH transmission occasion associated with the configuration index,
   the second set of SPS PDSCH transmission occasions including the plurality of SPS PDSCH transmission occasions.

2. The method of claim 1, wherein the UE performs the first action in response to the receiving the SPS release when the SPS release is received at least a threshold number of symbols prior to a start of an earliest SPS PDSCH transmission occasion of the plurality of SPS PDSCH transmission occasions.

3. The method of claim 2, wherein the threshold number of symbols is 14.

4. The method of claim 2, wherein the SPS release is received in a slot prior to a slot containing the plurality of SPS PDSCH transmission occasions.

5. The method of claim 1, wherein the UE performs the second action when the SPS release is received less than N symbols prior to a start of an earliest SPS PDSCH transmission occasion of the plurality of SPS PDSCH transmission occasions.

6. The method of claim 1, wherein a hybrid automatic request (HARQ) acknowledgment (ACK) for the SPS release is transmitted on a location in a HARQ-ACK codebook that is different from those locations for the plurality of SPS PDSCH transmission occasions.

7. The method of claim 6, wherein the HARQ-ACK codebook is a type-1 HARQ-ACK codebook.

8. The method of claim 1, further comprising:
   determining that a hybrid automatic request (HARQ) acknowledgment (ACK) for the SPS release is scheduled on a location in a HARQ-ACK codebook that is same as a location in the HARQ-ACK codebook scheduled for a HARQ-ACK for any SPS PDSCH transmission occasion of the plurality of SPS PDSCH transmission occasions remaining after the performing the first action or the performing the second action; and
   identifying, in response to the determining, that a HARQ-ACK scheduling error has occurred.

9. The method of claim 1, wherein the applying the first SPS PDSCH transmission occasions collision avoidance procedure to the first set of SPS PDSCH transmission occasions includes releasing a SPS PDSCH transmission occasion of the first set of SPS PDSCH transmission occasions that overlaps with a SPS PDSCH transmission occasion, of the first set of SPS PDSCH transmission occasions, associated with a smallest configuration index.

10. The method of claim 1, wherein the applying the second SPS PDSCH transmission occasions collision avoidance procedure to the second set of SPS PDSCH transmission occasions includes releasing a SPS PDSCH transmission occasion of the second SPS PDSCH transmission occasions that overlaps with a SPS PDSCH transmission occasion, of the second set of SPS PDSCH transmission occasions, associated with a smallest configuration index.

11. The method of claim 1, wherein the second action includes applying the second SPS PDSCH transmission occasions collision avoidance procedure to the second set of SPS PDSCH transmission occasions followed by releasing the SPS PDSCH transmission occasion associated with the configuration index if remaining after the performing the second SPS PDSCH transmission occasion collision avoidance procedure.

12. A method of wireless communication performed by a user equipment (UE), the method comprising:

identifying one or more semi-persistent scheduling (SPS) physical downlink shared channel (PDSCH) transmission occasions in a slot;

receiving, from a base station (BS) and via a physical downlink control channel (PDCCH), a semi-persistent scheduling (SPS) activation downlink control information (DCI) configured to activate at the UE a SPS configuration, the SPS configuration including a configuration index and configured to schedule a SPS PDSCH transmission occasion associated with the configuration index; and activating or reactivating, in response to the receiving the SPS activation, the SPS PDSCH transmission occasion associated with the configuration index based on:

a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or a comparison of a first result of applying a first SPS PDSCH transmission occasions collision avoidance procedure and a second result of applying a second SPS PDSCH transmission occasions collision avoidance procedure, the first SPS PDSCH transmission occasions collision avoidance procedure applied to a first set of SPS PDSCH transmission occasions including the one or more SPS PDSCH transmission occasions; and the second SPS PDSCH transmission occasions collision avoidance procedure applied to a second set of SPS PDSCH transmission occasions including the SPS PDSCH transmission occasion associated with the configuration index and the one or more SPS PDSCH transmission occasions.

13. The method of claim 12, wherein the activating or reactivating based on the separation in symbols includes activating or reactivating the SPS PDSCH transmission occasion associated with the configuration index when the separation in symbols is no less than a threshold number of symbols.

14. The method of claim 13, wherein the threshold number of symbols is 14.

15. The method of claim 12, further comprising:

determining that the separation in symbols between the end of the SPS activation DCI and the start of the earliest SPS PDSCH transmission occasion is less than a threshold number of symbols; and identifying, in response to the determining, that a scheduling error has occurred.

16. The method of claim 12, wherein the activating or reactivating based on the comparison of the first result and the second result includes activating or reactivating the SPS PDSCH transmission occasion associated with the configuration index when the comparison indicates that the first result is the same as the second result.

17. The method of claim 12, further comprising identifying a scheduling error has occurred when the first result differs from the second result.

18. A user equipment (UE), comprising:

a processor configured to:

identify a plurality of semi-persistent scheduling (SPS) physical downlink shared channel (PDSCH) transmission occasions in a slot;

a transceiver configured to:

receive, from a base station (BS) and via a physical downlink control channel (PDCCH), a semi-persistent scheduling (SPS) release configured to release at the UE a SPS configuration including a configuration index, the SPS configuration configured to schedule, of the plurality of SPS PDSCH transmission occasions in the slot, a SPS PDSCH transmission occasion associated with the configuration index, the processor further configured to, in response to the receiving the SPS release, perform:

a first action that is releasing the SPS PDSCH transmission occasion associated with the configuration index followed by applying a first SPS PDSCH transmission occasions collision avoidance procedure to a first set of SPS PDSCH transmission occasions, the first set of SPS PDSCH transmission occasions including SPS PDSCH transmission occasions of the plurality of SPS PDSCH transmission occasions remaining after the releasing the SPS PDSCH transmission occasion associated with the configuration index; or a second action that is applying a second SPS PDSCH transmission occasions collision avoidance procedure to a second set of SPS PDSCH transmission occasions followed by releasing the SPS PDSCH transmission occasion associated with the configuration index, the second set of SPS PDSCH transmission occasions including the plurality of SPS PDSCH transmission occasions.

19. The UE of claim 18, wherein the UE performs the first action in response to the receiving the SPS release when the SPS release is received at least a threshold number of symbols prior to a start of an earliest SPS PDSCH transmission occasion of the plurality of SPS PDSCH transmission occasions.

20. The UE of claim 18, wherein the UE performs the second action when the SPS release is received less than N symbols prior to a start of an earliest SPS PDSCH transmission occasion of the plurality of SPS PDSCH transmission occasions.

21. The UE of claim 18, wherein a hybrid automatic request (HARQ) acknowledgment (ACK) for the SPS release is transmitted on a location in a HARQ-ACK codebook that is different from those locations for the plurality of SPS PDSCH transmission occasions.

22. The UE of claim 18, wherein the processor is further configured to:

determine that a hybrid automatic request (HARQ) acknowledgment (ACK) for the SPS release is scheduled on a location in a HARQ-ACK codebook that is same as a location in the HARQ-ACK codebook scheduled for a HARQ-ACK for any SPS PDSCH transmission occasion of the plurality of SPS PDSCH transmission occasions remaining after the performing the first action or the performing the second action; and identify, in response to the determining, that a HARQ-ACK scheduling error has occurred.

23. The UE of claim 18, wherein the applying the first SPS PDSCH transmission occasions collision avoidance procedure to the first set of SPS PDSCH transmission occasions includes releasing a SPS PDSCH transmission occasion of the first set of SPS PDSCH transmission occasions that overlaps with a SPS PDSCH transmission occasion, of the first set of SPS PDSCH transmission occasions, associated with a smallest configuration index.

24. The UE of claim 18, wherein the applying the second SPS PDSCH transmission occasions collision avoidance procedure to the second set of SPS PDSCH transmission occasions includes releasing a SPS PDSCH transmission occasion of the second SPS PDSCH transmission occasions that overlaps with a SPS PDSCH transmission occasion, of the second set of SPS PDSCH transmission occasions, associated with a smallest configuration index.

25. The UE of claim 18, wherein the second action includes applying the second SPS PDSCH transmission occasions collision avoidance procedure to the second set of SPS PDSCH transmission occasions followed by releasing the SPS PDSCH transmission occasion associated with the configuration index if remaining after the performing the second SPS PDSCH transmission occasion collision avoidance procedure.

26. A user equipment (UE), comprising:
a processor configured to:
identify one or more semi-persistent scheduling (SPS) physical downlink shared channel (PDSCH) transmission occasions in a slot;
a transceiver configured to:
receive, from a base station (BS) and via a physical downlink control channel (PDCCH), a semi-persistent scheduling (SPS) activation downlink control information (DCI) configured to activate at the UE a SPS configuration,
the SPS configuration including a configuration index and configured to schedule a SPS PDSCH transmission occasion associated with the configuration index, the processor further configured to, in response to the receiving the SPS activation:
activate or reactivate the SPS PDSCH transmission occasion associated with the configuration index based on:
a separation in symbols between an end of the SPS activation DCI and a start of an earliest SPS PDSCH transmission occasion of the one or more SPS PDSCH transmission occasions in a same slot as the SPS PDSCH transmission occasion associated with the configuration index; or
a comparison of a first result of applying a first SPS PDSCH transmission occasions collision avoidance procedure and a second result of applying a second SPS PDSCH transmission occasions collision avoidance procedure,
the first SPS PDSCH transmission occasions collision avoidance procedure applied to a first set of SPS PDSCH transmission occasions including the one or more SPS PDSCH transmission occasions; and
the second SPS PDSCH transmission occasions collision avoidance procedure applied to a second set of SPS PDSCH transmission occasions including the SPS PDSCH transmission occasion associated with the configuration index and the one or more SPS PDSCH transmission occasions.

27. The UE of claim 26, wherein the processor is further configured to activate or deactivate the SPS PDSCH transmission occasion associated with the configuration index when the separation in symbols is no less than a threshold number of symbols.

28. The UE of claim 26, wherein the processor is further configured to:
determine that the separation in symbols between the end of the SPS activation DCI and the start of the earliest SPS PDSCH transmission occasion is less than a threshold number of symbols; and
identify, in response to the determining, that a scheduling error has occurred.

29. The UE of claim 26, wherein the processor is further configured to activate or deactivate the SPS PDSCH transmission occasion associated with the configuration index when the comparison indicates that the first result is the same as the second result.

30. The UE of claim 26, wherein the processor is further configured to identify a scheduling error has occurred when the first result differs from the second result.

* * * * *